United States Patent
Nakajima

(10) Patent No.: US 7,634,718 B2
(45) Date of Patent: Dec. 15, 2009

(54) HANDWRITTEN INFORMATION INPUT APPARATUS

(75) Inventor: Kenji Nakajima, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 255 days.

(21) Appl. No.: 11/077,229

(22) Filed: Mar. 11, 2005

(65) Prior Publication Data
US 2006/0114239 A1    Jun. 1, 2006

(30) Foreign Application Priority Data
Nov. 30, 2004    (JP) .............................. 2004-347733

(51) Int. Cl.
*G06F 17/24* (2006.01)

(52) U.S. Cl. .................. 715/224; 715/200; 715/255; 715/256; 715/811; 715/825

(58) Field of Classification Search .............. 715/500, 715/507, 530, 531, 811, 825, 200, 224, 255, 715/256
See application file for complete search history.

(56) References Cited

U.S. PATENT DOCUMENTS

| | | | | |
|---|---|---|---|---|
| 5,491,758 A * | 2/1996 | Bellegarda et al. | ........... | 382/187 |
| 5,848,187 A * | 12/1998 | Bricklin et al. | ............. | 382/187 |
| 5,859,636 A * | 1/1999 | Pandit | ..................... | 715/501.1 |
| 6,005,567 A * | 12/1999 | Nielsen | ....................... | 715/823 |
| 6,340,967 B1 * | 1/2002 | Maxted | ....................... | 345/179 |
| 6,664,991 B1 * | 12/2003 | Chew et al. | ................. | 715/863 |
| 7,103,853 B1 * | 9/2006 | Patil | ............................ | 715/824 |
| 2003/0182630 A1 * | 9/2003 | Saund et al. | ................. | 715/530 |

FOREIGN PATENT DOCUMENTS

| | | |
|---|---|---|
| JP | 5-62008 | 3/1993 |
| JP | 5-189149 | 7/1993 |
| JP | 6-19612 | 1/1994 |
| JP | 2000-181606 | 6/2000 |
| JP | 2003-44214 | 2/2003 |

OTHER PUBLICATIONS

Kenji Nakajima et al., "Input of Information Using Tablet From Freely Handwritten Note" and its partial translation.

* cited by examiner

*Primary Examiner*—Joshua D Campbell
(74) *Attorney, Agent, or Firm*—Kratz, Quintos & Hanson, LLP

(57) ABSTRACT

A handwritten information input apparatus includes: a tablet including a handwriting input region and a text input item region; a pencraft selection processing part for receiving a handwritten input that selects at least a part of the pencraft displayed in the handwriting input region, and confirming the selected pencraft; a pencraft recognizing part for recognizing the pencraft confirmed by the pencraft selection processing part; an item storing part for previously storing information on an input item to be displayed in the text input item region; an item selection processing part for generating an item list for allowing an operator to select which input item in the text input item region a recognition result is sent to, based on the information stored in the item storing part; and an item input part for sending the recognition result to the input item selected in the item list, whereby an input destination item for the recognition result of the pencraft input by handwriting can be designated easily, or it is not necessary to designate an input destination item.

13 Claims, 23 Drawing Sheets

HANDWRITTEN INFORMATION INPUT APPARATUS

BACKGROUND OF THE INVENTION

1. Field of the Invention

The present invention relates to a handwritten information input apparatus including a handwriting input region in which an operator is capable of freely inputting data by handwriting, and a text input item region for inputting text data in a previously determined item, and in particular, to a handwritten information input apparatus capable of recognizing a pencraft input by handwriting, and easily inputting a recognition result thereof in a text input item region.

2. Description of the Related Art

In front service such as customer service, telephone service, and the like, a person in charge mostly takes a note on paper during service, and inputs information in a computer by operating a keyboard and a mouse while watching the note after the completion of the service. In such service, there are problems: (1) the time and effort are repeated between the note taking and the data input, which particularly decreases the working efficiency of an operator unfamiliar with a keyboard; (2) it is difficult to input graphics with a keyboard and a mouse; and (3) it entails a cost to store an original note.

In order to solve the above-mentioned problems, a handwritten information input apparatus is known, in which a required portion can be selected and input from an electronically input handwritten note, using a tablet or the like. Hereinafter, an input method in a conventional handwritten information input apparatus will be described with reference to FIGS. 17 to 23.

First, when an operator presses a handwritten note activation button 101 on a main screen in FIG. 17, a handwritten note input window 102 is opened as shown in FIG. 18. In the handwritten note input window 102, a handwriting input region 102a is provided, in which handwriting input can be performed with a pen or the like. The operator writes the contents of a note as shown in FIG. 18. After writing, when the operator presses a "Close" button 102b of the handwritten note input window 102, the handwritten note input window 102 returns to the main screen as shown in FIG. 19, and the handwritten note input previously is displayed in a note display region 103. In the note display region 103, a note cannot be added, and only the viewing and selection of a pencraft can be performed. This saves the operator from having to concern about whether a current mode is a handwritten note input mode or a pencraft selection mode.

Thereafter, the operator selects a pencraft desired to be recognized in the note display region 103 by a circle gesture using a pen, as shown in FIG. 20. In FIG. 20, a trail 104 of the circle gesture is displayed, assuming that the operator has selected a pencraft "Smith" in the note display region 103.

As shown in FIG. 21, when the operator presses a button adjacent to an item in which the operator desires to input a recognition result in a text input item region 105 after selecting the pencraft as described above, a character recognition window 73 is activated. In FIG. 21, the operator presses a "Customer" button 105b. In the character recognition window 73, a recognition result candidate of the pencraft selected by the operator in FIG. 20 is displayed. Simultaneously, an arrow-shaped graphic 74 pointing an input destination of the recognition result is displayed from the character recognition window 73 toward the "Customer" button 105b pressed by the operator. This enables the operator to visually recognize that the recognition result in the character recognition window 73 is input in the "Customer" item. In the case where there is no error in the recognition result in the character recognition window 73, the operator presses a confirmation button 73a of the character recognition window 73, whereby the recognition result is input in the "Customer" item as shown in FIG. 22.

As shown in FIG. 23, in the case where the recognition result candidate displayed in the character recognition window 73 is "Dost Office", and the operator desires to correct it, when the operator taps the leading character "D" in the recognition result candidate with a pen, other recognition candidate characters are displayed in a candidate selection section 73b of the character recognition window 73, and a window 108 for displaying how a character is cut from the pencraft designated by the operator is activated in an upper portion of the character recognition window 73. In the case where the way to cut a character from the pencraft is incorrect, the operator can correct the character cut error by circling and underling a character on the window 108. A correct character may be rewritten in a writing frame 73c of the character recognition window 73 by handwriting, without using the window 108.

As described above, the conventional handwritten information input apparatus is more advantageous than a method for manually inputting information from a handwritten note to a computer after the completion of service in the following points: (1) the operator is saved from the time and effort for inputting information written on a note again; (2) owning to the handwriting input, it is also easy to input a graphic; and (3) it is not necessary to store an original note.

Furthermore, a system is also known, in which when a note is taken in a handwriting note region by handwriting input, data corresponding to each item of an input screen is automatically recognized, and input to the concerned item (e.g., see JP 2000-181606 A (FIGS. 9 and 10, pages 12-13).

SUMMARY OF THE INVENTION

However, the conventional handwritten information input apparatus described with reference to FIGS. 17 to 23 have the following problems.

In the above-mentioned conventional handwritten information input apparatus, in order to increase the capacity of notes, it is necessary to enlarge the area of the handwritten note input window 102 due to the constraint of the resolution of a display and the like. Furthermore, it is necessary to facilitate the selection of a pencraft from a written note, so that a note cannot be displayed with an excessively reduced size, and there is a limit to the number of input items capable of being displayed simultaneously with the handwritten note input window 102 or the note display region 103.

Thus, in the case where the number of input items is large, the input items are arranged so as to be distributed on a plurality of windows. In this case, in order to find an item to be an input destination of a recognition result, the operator needs to switch the plurality of windows.

Furthermore, even in the case where input items and the note display region 103 are displayed on an identical screen, in order to select a pencraft in the note display region 103, and designate an item of an input destination of a recognition result, it is necessary to allow a pen to reciprocate a number of times on a screen, which is cumbersome for the operator.

Therefore, with the foregoing in mind, it is an object of the present invention to provide a handwritten information input apparatus which is capable of easily designating an input destination item of a recognition result of a pencraft input by handwriting input, or which makes it unnecessary to designate an input destination item.

In order to achieve the above-mentioned object, a first handwritten information input apparatus according to the present invention includes: an input/output apparatus including a handwriting input region for receiving a handwritten input of a character, a symbol, or a graphic and displaying an input pencraft, and a text input item region; a pencraft selection processing part for receiving a handwritten input that selects at least a part of the pencraft displayed in the handwriting input region, and confirming the selected pencraft; a pencraft recognizing part for receiving and recognizing the pencraft confirmed by the pencraft selection processing part; an item storing part for previously storing information on an input item to be displayed in the text input item region; an item selection processing part for generating an item list for allowing an operator to select which input item in the text input item region a recognition result of the pencraft recognizing part is sent to, based on the information stored in the item storing part; and an item input part for sending the recognition result of the pencraft recognizing part to the input item selected in the item list.

According to the above configuration, the item list for allowing the operator to select which input item in the text input item region the recognition result of the pencraft recognizing part is sent to is displayed in the input/output apparatus. Therefore, it is not necessary for the operator to switch a plurality of windows so as to find an item to be an input destination of the recognition result, unlike the conventional example, and it is not necessary to allow the hand to reciprocate a number of times on the screen of the input/output apparatus so as to designate an item of an input destination of the recognition result. Consequently, a handwritten information input apparatus can be provided, which is capable of easily designating an input destination item of the recognition result of the pencraft input by handwriting.

In the first handwritten information input apparatus according to the present invention, it is preferable that the item selection processing part displays the item list after the pencraft is selected by the pencraft selection processing part. Alternatively, the item selection processing part may display the item list before the pencraft is selected by the pencraft selection processing part.

In the first handwritten information input apparatus according to the present invention, it is preferable that the item selection processing part displays the item list in the vicinity of the pencraft selected by the pencraft selection processing part. According to this configuration, the distance at which the operator moves the hand on the screen of the input/output apparatus is shortened, so that the operation can be performed easily.

In the first handwritten information input apparatus according to the present invention, it is preferable that the input/output apparatus switches a display item in the text input item region so that the input item selected in the item list is displayed. According to this configuration, the operator can visually recognize an input item easily in the text item region.

In the first handwritten information input apparatus according to the present invention, it is preferable that, in a case where data is input in the input item from an identical pencraft a plurality of times, the item list is displayed at second and subsequent times under a condition that an input item selected previously is not to be selected or that the input item selected previously is excluded from the item list. According to this configuration, the input item that has already been selected is omitted from the item list, whereby the choice of options in the item list is narrowed down, and the operator can select an input item more easily.

It is preferable that the first handwritten information input apparatus according to the present further includes: a presumed information storing part for storing statistical information on input data with respect to each item, regarding an input item displayed in the text input item region; and an item presuming part for presuming an input item to which the recognition result is to be sent, based on a content of the recognition result of the pencraft recognizing part and the statistical information in the presumed information storing part, and giving the presumed result to the item selection processing part, thereby narrowing down items to be presented in the item list. According to this configuration, in the case where the input item is matched with the recognition result, the operator can send the recognition result to the item with a very simple operation of, for example, merely pressing a confirmation button or the like, without selecting an item list.

A second handwritten information input apparatus according to the present invention includes: an input/output apparatus including a handwriting input region for receiving a handwritten input of a character, a symbol, or a graphic and displaying an input pencraft, and a text input item region; a pencraft selection processing part for receiving a handwritten input that selects at least a part of the pencraft displayed in the handwriting input region, and confirming the selected pencraft; a pencraft recognizing part for receiving and recognizing the pencraft confirmed by the pencraft selection processing part; an item storing part for previously storing information on an input item to be displayed in the text input item region; an item selection processing part for successively designating at least a partial input item in the text input item region, based on the information stored in the item storing part, thereby designating which input item in the text input item region a recognition result of the pencraft recognizing part is sent to, with respect to an operator; and an item input part for sending the recognition result of the pencraft recognizing part to the input item designated by the item selection processing part.

According to the above configuration, the item selection processing part successively designates at least a partial input item in the text input item region, based on information in the item storing part that previously stores information on an input item to be displayed in the text input item region. If the operator selects a pencraft to be input in the designated input item, the recognition result thereof is sent to the input item by the item input part. Therefore, it is not necessary for the operator to switch a plurality of windows so as to find an item to be an input destination of the recognition result, unlike the conventional example, and it is not necessary to allow the hand to reciprocate a number of times on the screen of the input/output apparatus so as to designate an item of an input destination of the recognition result. Consequently, a handwritten information input apparatus can be provided, in which the recognition result of a pencraft input by handwriting can be input easily without designating an input destination item.

Furthermore, in order to achieve the above-mentioned object, a first program product according to the present invention stores, on a recording medium, a program for allowing a computer, which is provided with an input/output apparatus including a handwriting input region for receiving a handwritten input of a character, a symbol, or a graphic, and displaying an input pencraft, and a text input item region, to perform handwritten information input processing. The program allows the computer to perform: pencraft selection processing for receiving a handwritten input that selects at least a part of a pencraft displayed in the handwriting input region, and confirming the selected pencraft; pencraft recognizing processing for receiving and recognizing the pencraft confirmed by the pencraft selection processing; item selection processing for referring to an item storing part for previously storing information on an input item to be displayed in the text input item region, generating an item list for allowing an operator to select which input item in the text input item region a recognition result of the pencraft recognizing processing is sent to, based on the information, and displaying the item list in the input/output apparatus; and item input processing for sending the recognition result of the pencraft recognizing processing to the input item selected in the item list.

Furthermore, in order to achieve the above-mentioned object, a second program product according to the present invention stores, on a recording medium, a program for allowing a computer, which is provided with an input/output apparatus including a handwriting input region for receiving a handwritten input of a character, a symbol, or a graphic, and displaying an input pencraft, and a text input item region, to perform handwritten information input processing. The program allows the computer to perform: pencraft selection processing for receiving a handwritten input that selects at least a part of a pencraft displayed in the handwriting input region, and confirming the selected pencraft; pencraft recognizing processing for receiving and recognizing the pencraft confirmed by the pencraft selection processing; item selection processing for referring to an item storing part for previously storing information on an input item to be displayed in the text input item region, and successively designating at least a partial input item in the text input item region, based on the information, thereby designating which input item in the text input item region a recognition result of the pencraft recognizing part is sent to, with respect to an operator; and item input processing for sending the recognition result of the pencraft recognizing processing to the input item designated in the item selection processing.

As described above, according to the present invention, a handwritten information input apparatus can be provided, which is capable of easily designating an input destination item of a recognition result of a pencraft input by handwriting, or which makes it unnecessary to designate an input destination item.

These and other advantages of the present invention will become apparent to those skilled in the art upon reading and understanding the following detailed description with reference to the accompanying figures.

DESCRIPTION OF THE PREFERRED EMBODIMENTS

Embodiment 1

Figure 1:
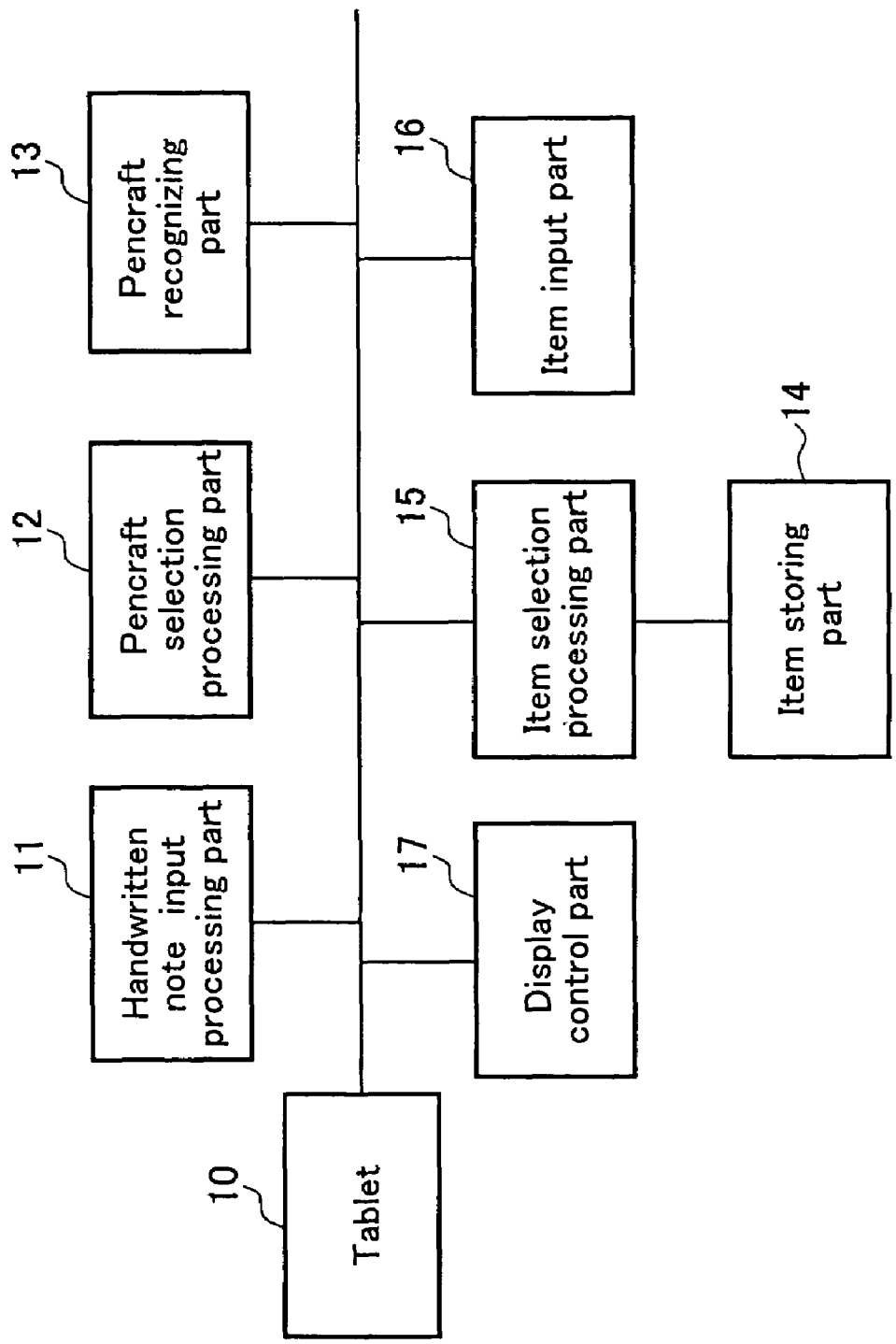
FIG. 1 is a block diagram schematically showing a configuration of a handwritten information input apparatus according to Embodiment 1 of the present invention.

FIG. 1 is a block diagram functionally showing a schematic configuration of a handwritten information input apparatus according to Embodiment 1 of the present invention.

The handwritten information input apparatus according to the present embodiment is a so-called tablet-type personal computer, a personal computer provided with a display tablet, a personal digital assistant (PDA), or the like, which enables handwriting input on a screen with a pen. Furthermore, the handwritten information input apparatus of the present embodiment has a configuration in which an arbitrary note can be taken by handwriting input, and when an operator selects at least a part of a pencraft written on a note, a character or the like in a selected portion is recognized and a recognition result is sent to a text input item.

Therefore, as shown in FIG. 1, the handwritten information input apparatus of the present embodiment includes a tablet 10 as an input/output apparatus, a handwritten note input processing part 11, a pencraft selection processing part 12, a pencraft recognizing part 13, an item storing part 14, an item selection processing part 15, an item input part 16, and a display control part 17.

The handwritten note input processing part 11 and the display control part 17 have a function of controlling the handwriting input processing on the tablet 10 and a function of storing the contents of a note. When the operator draws a character or a graphic on a screen with a pen as if he/she took a note on paper, the handwritten note input processing part 11 detects the coordinate of a pen point by a well-known method. The detected coordinate is given to the display control part 17, and a trail (pencraft) of the pen is displayed on the screen by the display control part 17. As a method for storing the contents of the note, all the data may be stored as an image such as a bitmap. If stroke information which is a result of obtaining the positional information on a coordinate point at a predetermined time interval in a time series is stored with respect to each input pencraft, the pencraft can be extracted easily when it is recognized later. Therefore, in the case of inputting a pencraft with a tablet, it is preferable that the input pencraft is stored, using time-series information of a coordinate point as stroke information. Furthermore, the handwritten note input processing part 11 may have functions of storing the contents of a note as an image and cooperating with the display control part 17 to display an image in the background.

The pencraft selection processing part 12 allows the operator to select a part to be recognized from the pencraft input by the handwritten note input processing part 11, and sends the selected part to the pencraft recognizing part 13. The pencraft recognizing part 13 subjects the pencraft sent from the pencraft selection processing part 12 to character recognition, using a character pattern dictionary (not shown). The following may also be possible, a symbol, a graphic, and the like, as well as a character are cut from the part selected by the pencraft selection processing part 12, and the cut character and the like are recognized respectively using a character pattern dictionary and a graphic pattern dictionary. Furthermore, the pencraft recognizing part 13 also corrects a recognition result in accordance with the operation by the operator in the case where the recognition result is not correct.

The item storing part 14 stores titles of input items. The item selection processing part 15 displays a list menu of the input items stored in the item storing part 14 on the screen, and allows the operator to select which item the recognition result by the pencraft recognizing part 13 should be input in.

The item input part 16 inputs the recognition result by the pencraft recognizing part 13 as input data to a text input item selected by the operator in the item selection processing part 15. The display control part 17 controls various display operations on the screen.

The operation of the handwritten information input apparatus with the above-mentioned configuration will be described with reference to FIGS. 2 to 6.

Figure 2:
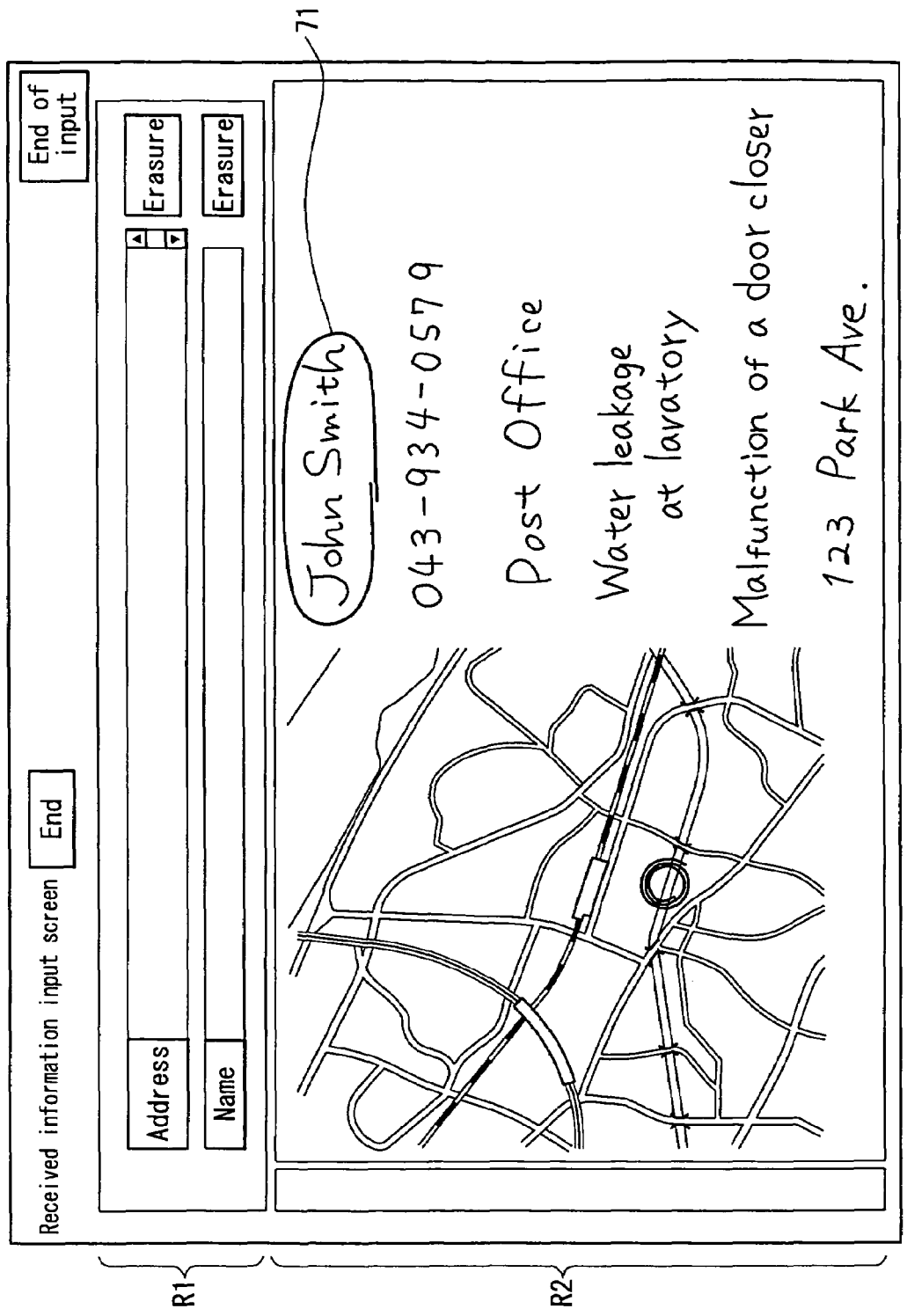
FIG. 2 shows an exemplary screen of the handwritten information input apparatus according to Embodiment 1.

FIG. 2 shows a state where the operator completes the input of a note by handwriting with a pen, and selects data to be sent to a text input item region from a pencraft on the note by a circle gesture, in the handwritten information input apparatus of the present embodiment.

In FIG. 2, a text input item region R1 is displayed in an upper portion of a screen, and a handwritten note display region R2 is displayed below the text input item region R1. In the handwritten information input apparatus of the present embodiment, a part of a pencraft input by handwriting in the handwritten note display region R2 can be selected and sent to a desired item of the text input item region R1 as input data. If a button with an item title displayed is tapped with a pen in the text input item region R1, data other than the note in the handwritten note display region R2 can also be input in an input frame adjacent to the button.

In the text input item region R1, titles and input sections are displayed with respect to a part of the input items stored in the item storing part 14 in accordance with the area of the region. In the example shown in FIG. 2, only two items "address" and "name" are displayed. As described later, in the handwritten information input apparatus of the present embodiment, the operator does not designate an input destination item in the text input item region R1, so that it is not necessary to display all the items in the text input item region R1.

The handwritten note display region R2 displays an image of the note written on the screen with a pen by the operator. In the handwritten note display region R2, the operator can only select a pencraft in the written note, and cannot add a note. At a time of input of a handwritten note, owing to the cooperative processing of the handwritten note input processing part 11 and the display control part 17, a handwritten note input window having an area larger than that of the handwritten note display region R2 is displayed on the screen. When the operator finishes writing a handwritten note in this window, the image of the contents of the note is displayed in the handwritten note display region R2 by the cooperative processing of the handwritten note input processing part 11 and the display control part 17.

In at least a part of the handwritten note display region R2 and the handwritten note input window, an arbitrary image (map in this example) can also be displayed as illustrated in FIG. 2. FIG. 2 is merely an example, the respective display embodiments of the text input item region R1 and the handwritten note display region R2, the positions or area ratio of the respective regions, and the like are not limited to this example.

In the example shown in FIG. 2, the operator circles a portion "John Smith" of the pencraft in the note (circle gesture), thereby selecting the portion as data to be sent to the text input item region R1. A trail 71 in FIG. 2 is that of the circle gesture and is displayed in the handwritten note display region R2 by the display control part 17. Because of this, the operator can visually recognize the portion selected by the operator. The trail of the circle gesture may not be a circular shape, and may be a rectangular shape. Furthermore, a method for the operator to designate a portion to be selected from the pencraft is not limited to the circle gesture. For example, various methods can be used, such as a method for tracing a portion to be selected in a straight line shape or a curved line shape, a method for setting a portion to be selected as a rectangular region, and designating an apex on a diagonal line, and the like.

When the operator selects a part of a pencraft, for example, by the circle gesture in the handwritten note display region R2, the pencraft selection processing part 12 sends an image or coordinate data of handwriting of the region surrounded by the trail of the circle gesture to the pencraft recognizing part 13.

Figure 3:
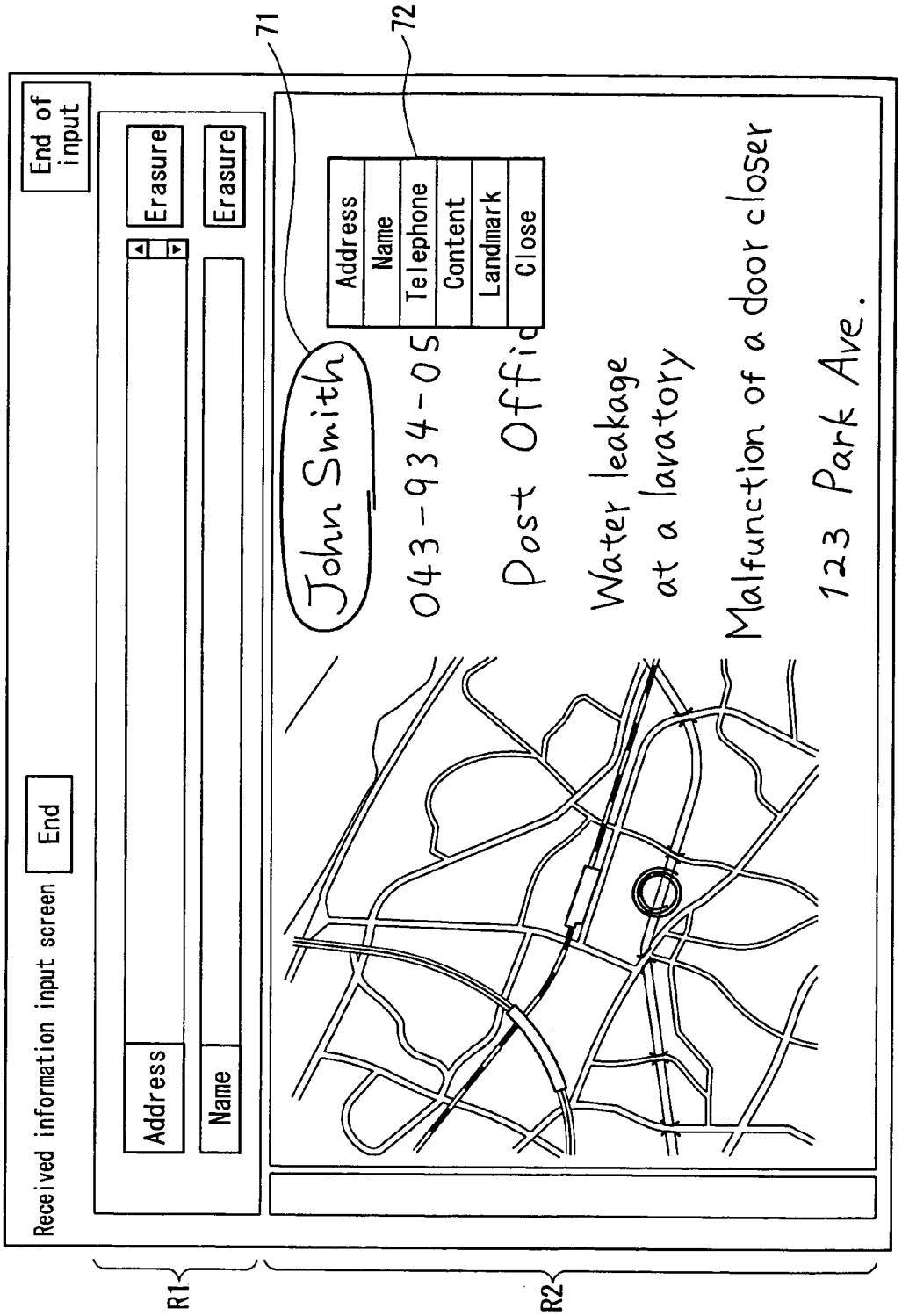
FIG. 3 shows an exemplary screen of the handwritten information input apparatus according to Embodiment 1.

Simultaneously with this, the item selection processing part 15 reads titles of input items stored in the item storing part 14 and sends it to the display control part 17. The display control part 17 displays an item list 72 listing the titles is displayed on the screen as shown in FIG. 3. The display position of the item list 72 is arbitrary, and is preferably displayed in the vicinity of the region surrounded by the trail of the circle gesture in terms of the facilitation of an operation.

In the above, a part of a pencraft is selected by the circle gesture in the handwritten note display region R2, and thereafter, the item list 72 is displayed. However, the following may also be possible: the item list 72 is previously displayed so as to allow the operator to select an item, and thereafter, allow the operator to select a pencraft corresponding to data to be input in the item in the handwritten note display region R2.

As a method for displaying the item list 72, various embodiments as described below are considered under the control by the display control part 17.

For example, the item list 72 may be displayed in the vicinity of the region in which a pencraft is selected by the circle gesture. If the display control part 17 acquires positional information on a selected region, and displays the item list 72 in the vicinity of the selected region, the movement amount of a pen point is minimized during the selection of an item, and the operation becomes more simplified.

Furthermore, the item list 72 may be displayed in the vicinity of the position of a pen point when the selection of a pencraft by the circle gesture is completed. For example, in the case where the handwritten information input apparatus of the present embodiment adopts an electromagnetic tablet, the position of a pen point can be determined even if the pen point is not in contact with the screen. Thus, if the display control part 17 acquires information on the position of a pen point, and displays the item list 72 in the vicinity of the pen point, the item list 72 is displayed in the vicinity of the pen point when an item is selected, which further reduces the movement amount of the pen point, and makes the operation more simple.

Furthermore, the item list 72 may be displayed following the movement of a pen point, from a time when the selection of a pencraft by the circle gesture is completed to a time when the selection of an item is completed. In the same way as the above, in the case where the information input apparatus adopts an electromagnetic tablet, even when the pen point is not in contact with the screen, the position of the pen point can be determined. Thus, if the display control part 17 sequentially acquires information on the position of a pen point, and displays the item list 72 so as to follow the movement of the pen point, the item list 72 is displayed in the vicinity of the pen point at all times, even when the pen is moved after the selection of a pen craft. Therefore, the movement amount of the pen point is further reduced during the selection of an item, and the operation becomes simplified.

In the case where a tablet (e.g., pressure-sensitive tablet) other than the electromagnetic tablet is adopted, the item list 72 may be displayed in the vicinity of a pen-up position where the selection of a pencraft is completed. Alternatively, the item list 72 may be displayed in the vicinity of a pen-down position where the selection of a pencraft is started.

Alternatively, the display control part 17 may determine the position where there are no pencraft of a note and a background image in the handwritten note display region R2, and display the item list 72 at that position.

In the case where a press button is provided on a body portion of a pen, the item list 72 may be displayed at a predetermined position or in the vicinity of a pen point as described above, when the operator presses the button before selecting a pencraft or after selecting a pencraft.

The item list 72 shown in FIG. 3 includes input item titles: "Name", "Address", "Telephone", "Content", and "Landmark". The handwritten information input apparatus of the present embodiment is used, for example, for the operator to take a note during a telephone response to a customer or the like. Therefore, the "Name" section is an item for inputting the name of a telephone partner, the "Address" section is an item for inputting the address of a telephone partner, the "Content" section is an item for inputting the contents of conversation, the "Landmark" is an item for inputting, for example, a landmark or the like for visiting a customer's residence. Furthermore, the item list 72 includes a "Close" section for closing the item list 72. When the operator selects any of the input item titles listed in the item menu 72 and taps it with a pen, the item selection processing part 15 sends selected item information representing which item has been tapped to the item input part 16 and the display control part 17. Herein, it is assumed that the operator selects the "Name".

Furthermore, the pencraft recognizing part 13 cuts out a character, a symbol, or a graphic from pencraft data (or an image) sent from the pencraft selection processing part 12, and recognizes each of the cut character and the like. As a method for cutting out a character and the like from pencraft data (or an image), and a method for recognizing the cut character and the like, a known arbitrary procedure can be used. The "cutting" of a character and the like refers to the processing of extracting a pencraft group (or an image region) determined to contain one independent character and the like from the pencraft data (or an image). The "recognition" of a character and the like refers to specifying which character in a character set used on a computer the cut pencraft group corresponds to, and specifying that the cut pencraft group is a graphic matched with the graphic pattern dictionary, using a character pattern dictionary or a graphic pattern dictionary.

Figure 4:
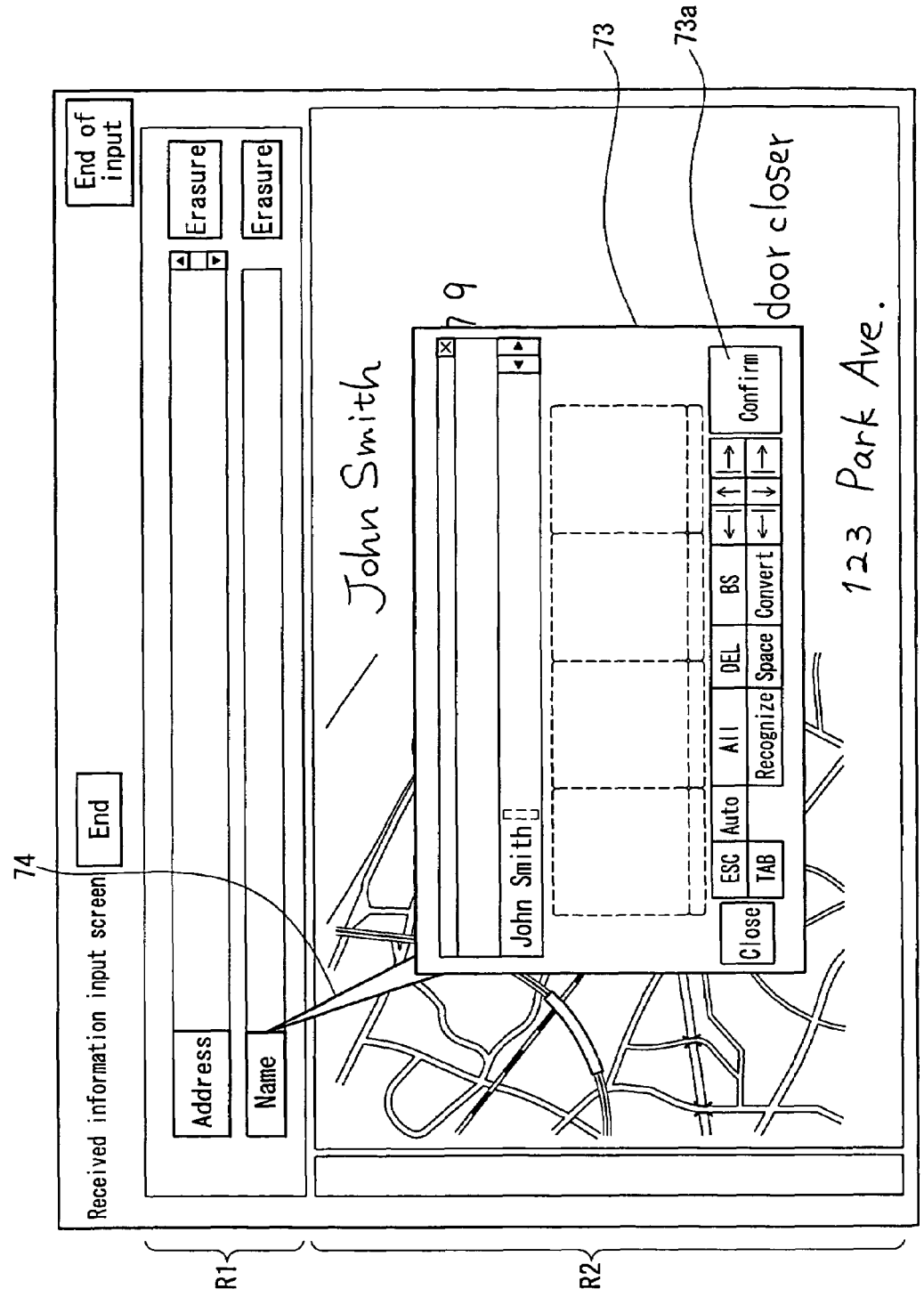
FIG. 4 shows an exemplary screen of the handwritten information input apparatus according to Embodiment 1.

The pencraft recognizing part 13 sends the recognition result to the display control part 17, whereby the character recognition window 73 for displaying the recognition result is displayed on the screen as shown in FIG. 4. Furthermore, the display control part 17 displays, on the screen, an arrow-shaped graphic 74 pointing the concerned item in the text input item region R1 from the character recognition window 73, based on the selected item information sent from the item selection processing part 15. More specifically, in the example shown in FIG. 4, since the operator selects the input item "Name", so that the tip end of the arrow-shaped graphic 74 points the "Name" section in the text input item region R1. Because of this, the operator can visually recognize that the recognition result in the character recognition window 73 is input in the "Name" section.

Then, when the operator taps a "Confirmation" button 73a in the character recognition window 73, a text "John Smith" that is the recognition result in the character recognition window 73 is captured by the item input part 16 as input data of the "Name" and stored on a disk. Simultaneously, the display control part 17 displays the text "John Smith" that is the recognition result of the character recognition window 73 in the "Name" section of the text input item region R1, as shown in FIG. 5.

Figure 5:
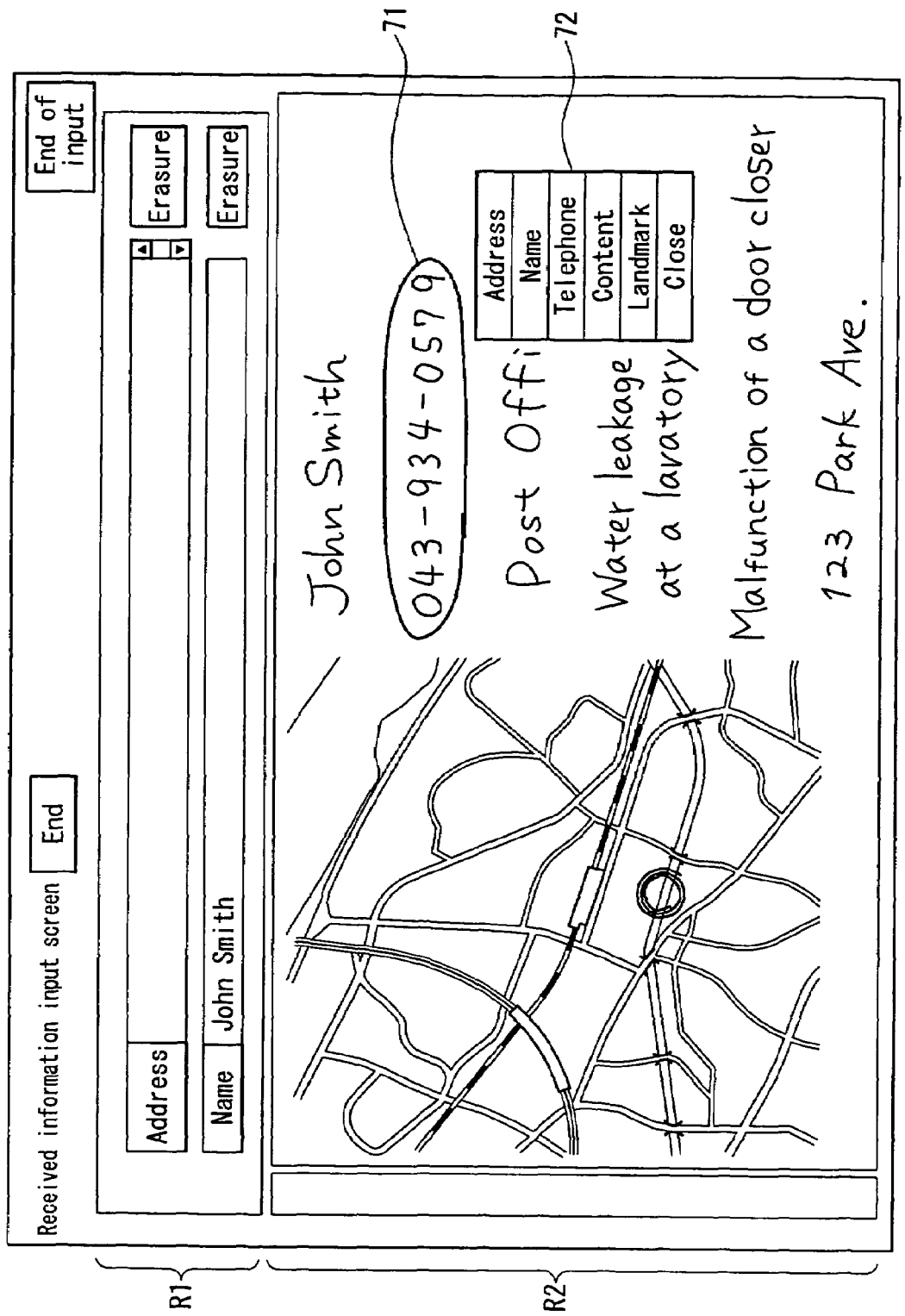
FIG. 5 shows an exemplary screen of the handwritten information input apparatus according to Embodiment 1.

FIG. 5 shows a state where the operator continuously selects a portion "043-934-0579" in a pencraft of the note as data to be sent to the text input item region R1 by the circle gesture with a pen.

When the operator selects a part of the pencraft by the circle gesture, in the handwritten note display region R2, the pencraft selection processing part 12 sends an image or coordinate data of handwriting of the region circled with a trace of the circle gesture to the pencraft recognizing part 13. Furthermore, the display control part 17 displays the trail of the circle gesture on the screen, whereby the operator can visually recognize the portion selected by the operator.

Figure 6:
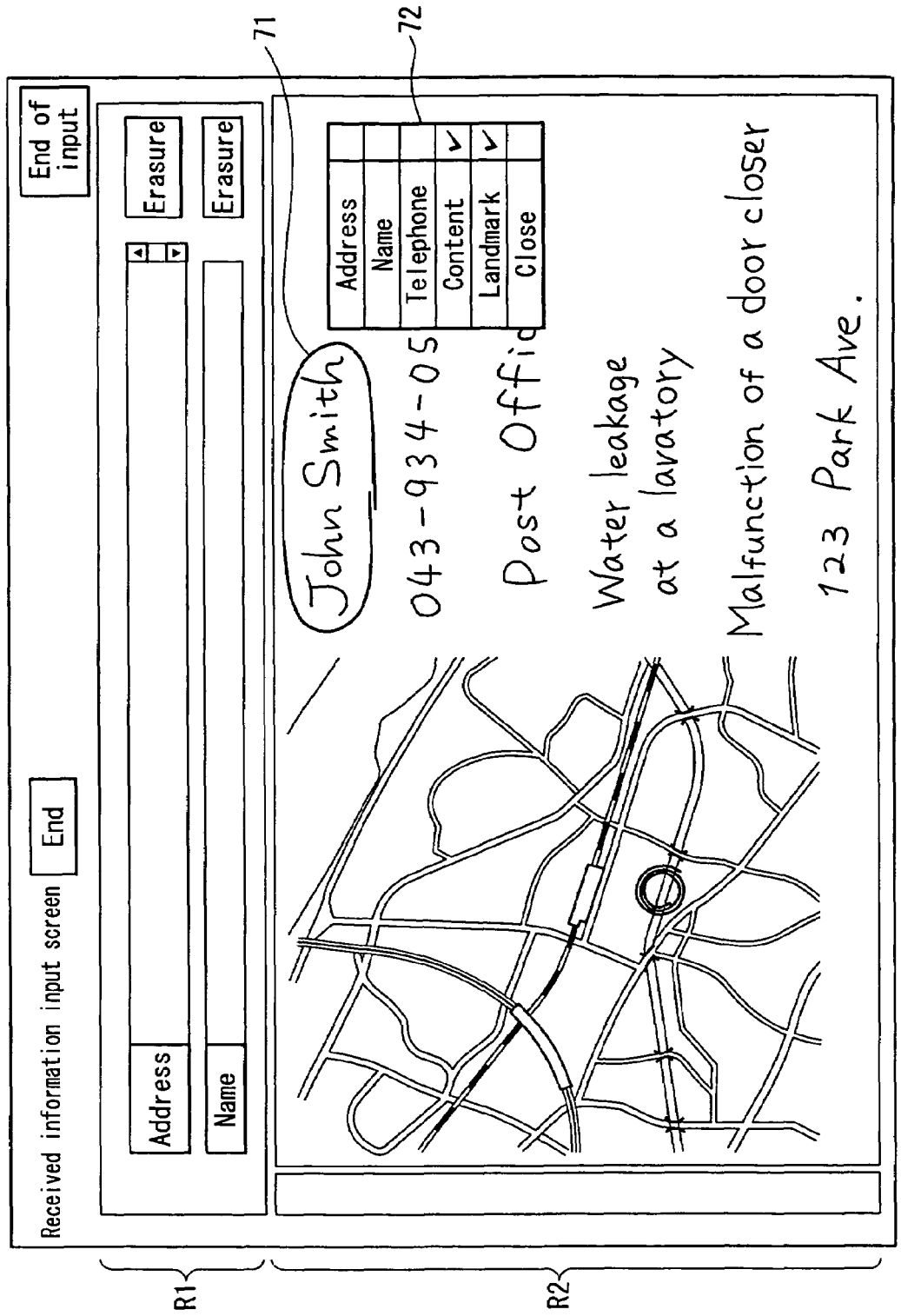
FIG. 6 shows an exemplary screen of the handwritten information input apparatus according to Embodiment 1.

Simultaneously, the item selection processing part 15 reads titles of input items stored in the item storing part 14 and sends them to the display control part 17. The display control part 17 displays the item list 72 listing the titles on the screen as shown in FIG. 5. The item list 72 in FIG. 5 includes a "Close" section for closing the item list 72, as well as input item titles "Name", "Address", "Telephone", "Content", and "Landmark". Herein, although the item list shown in FIG. 3 is the same as that shown in FIG. 5, an item list excluding an item title that has been selected previously may be displayed when the item list is displayed at the second and subsequent times. This eliminates the erroneous selection of the same input item. Alternatively, as shown in FIG. 6, the following may be possible. Sections for an item name and a selection are provided in the item list 72, a selected section is checked at a time of the selection of an item, and an item title that has been selected previously is displayed with a check mark.

When the operator selects any of the input item titles listed in the item menu 72, the item selection processing part 15 sends selected item information representing which item has been tapped to the item input part 16 and the display control part 17. Herein, it is assumed that the operator selects the "Telephone".

Figure 7:
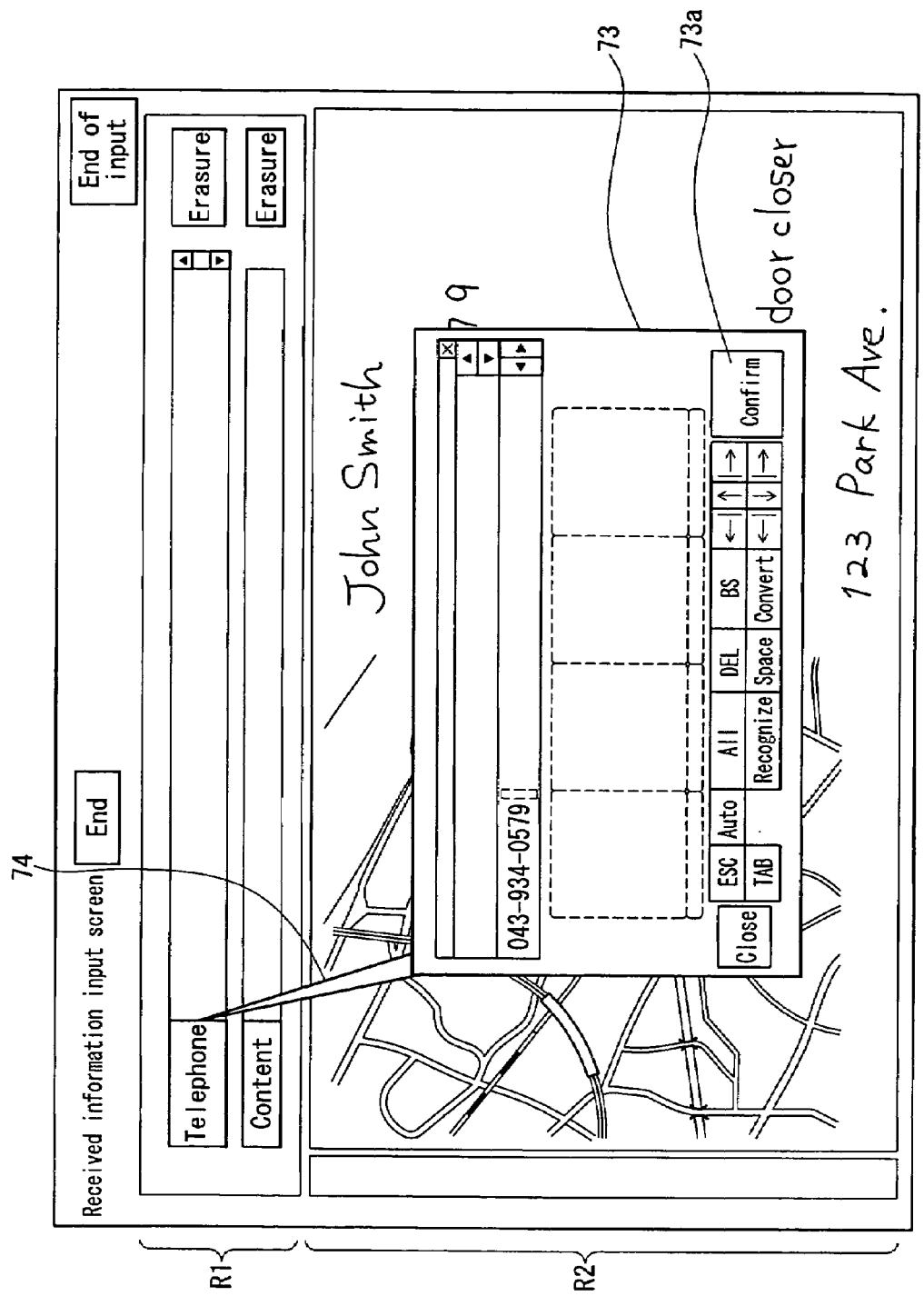
FIG. 7 shows an exemplary screen of the handwritten information input apparatus according to Embodiment 1.
Figure 8:
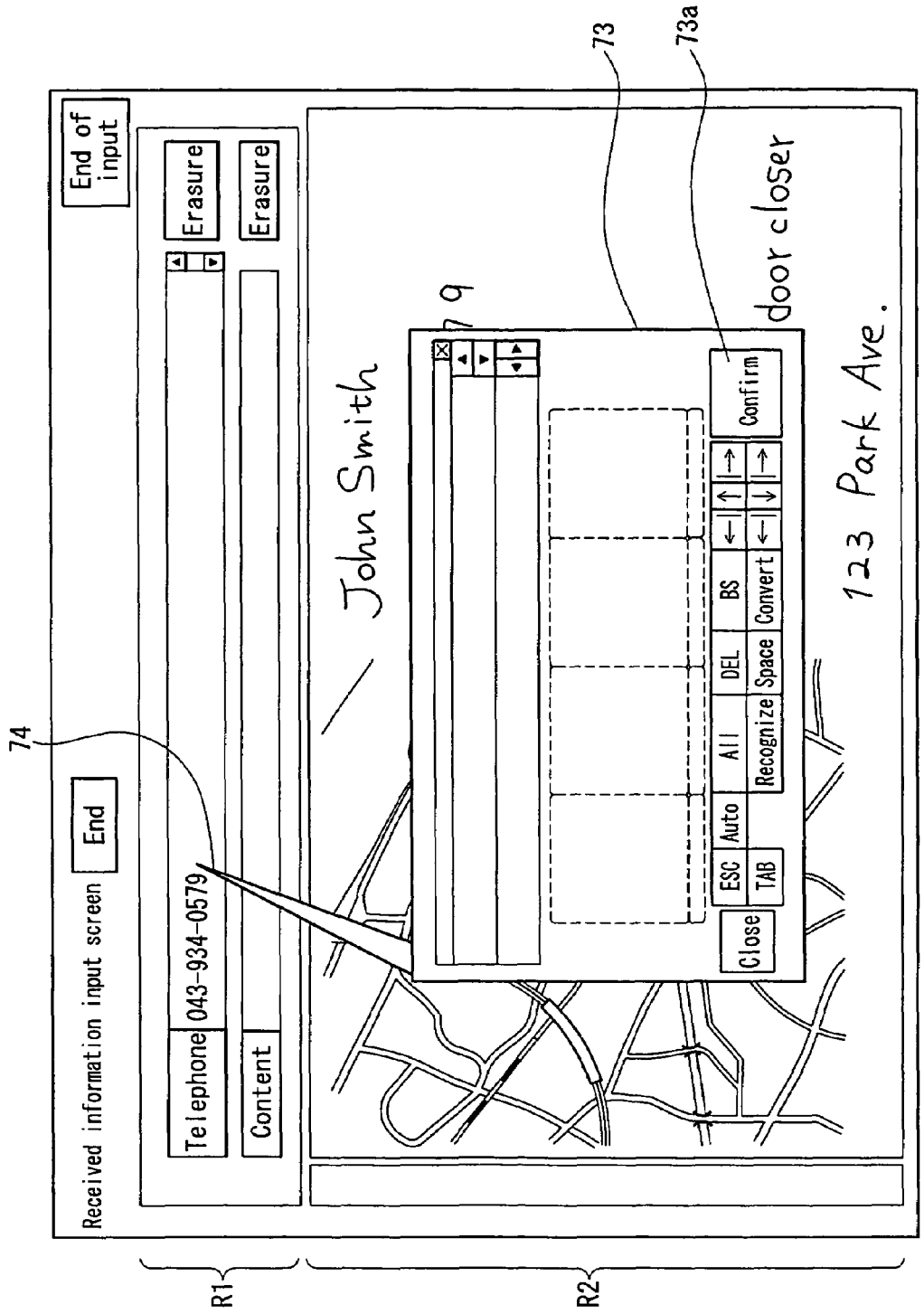
FIG. 8 shows an exemplary screen of the handwritten information input apparatus according to Embodiment 1.

The pencraft recognizing part 13 cuts out a character and a graphic from pencraft data (or an image) sent from the pencraft selection processing part 12, and recognizes each of the cut character and graphic. When the pencraft recognizing part 13 sends the recognition result to the display control part 17, the character recognition window 73 for displaying the recognition result is displayed on the screen as shown in FIG. 7. Furthermore, the display control part 17 displays, on the screen, the arrow-shaped graphic 74 pointing the concerned item in the text input item region R1 from the character recognition window 73, based on the selected item information sent from the item selection processing part 15.

In the example shown in FIG. 7, since the operator selects an input item "Telephone", the display embodiment of the text input item region R1 is changed so as to include the selected item by the display control part 17, and item sections "Telephone" and "Content" are displayed. The tip end of the arrow-shaped graphic 74 points the "Telephone" selection in the text input item region R1. This enables the operator to visually recognize that the recognition result in the character recognition window 73 is input in the "Telephone" section of the text input item region R1.

When the operator taps the "Confirmation" button 73a in the character recognition window 73, a text "043-934-0579" that is the recognition result in the character recognition window 73 is captured by the item input part 16 as input data of the "Telephone" and stored on a disk. Simultaneously, the display control part 17 displays the text "043-934-0579" that is the recognition result of the character recognition window 73 in the "Telephone" section of the text input item region R1.

The above-mentioned operation is repeated every time the operator selects a portion of a pencraft, whereby the contents of a note input by handwriting are sent to a required portion of the text input item region R1.

Figure 9:
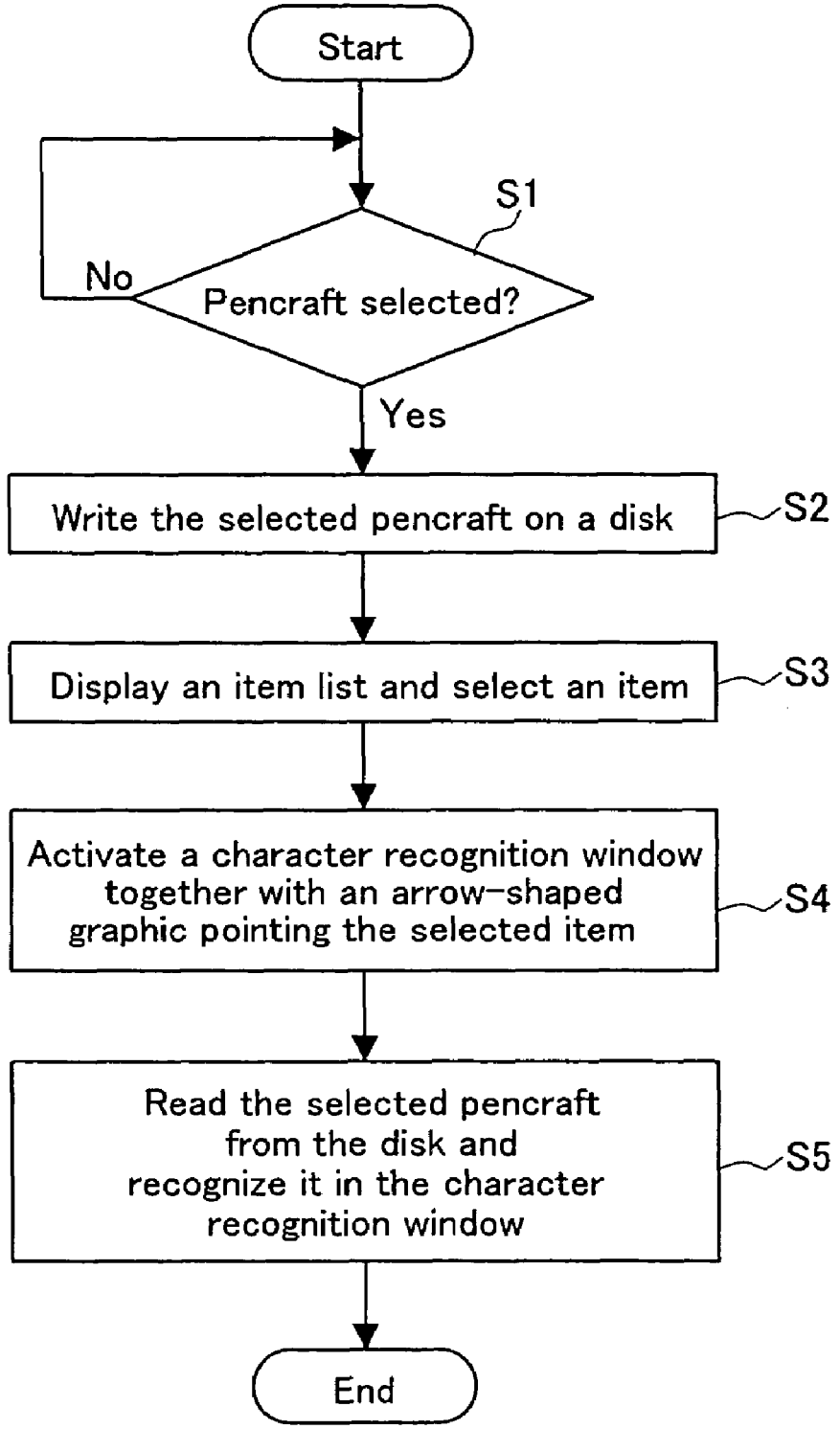
FIG. 9 is a flow chart showing a flow from an item list display for selecting an input destination item of a recognition result to recognition processing by a character recognition window, in the handwritten information input apparatus according to Embodiment 1.

FIG. 9 is a flow chart showing a flow from an item list display for selecting an input destination item of a recognition result to recognition processing by the character recognition window 73.

As shown in FIG. 9, when the operator selects a pencraft (Yes in S1), the pencraft selection processing part 12 writes the selected pencraft on a disk (hard disk or the like in the handwritten information input apparatus) (S2). Then, the item selection processing part 15 generates and displays the item list 72 with reference to item titles that have already been registered in the item storing part 14, and receives an input for selecting an item from the operator (S3). The item selected by the operator is given to the display control part 17, and the character recognition window 73 is activated by the cooperation of the display control part 17 and the pencraft recognizing part 13 (S4). When the character recognition window 73 is activated, the selected pencraft is read from the disk, and recognition processing is performed in the character recognition window 73 (S5). Herein, although the selected pencraft is written on the disk and read therefrom, the selected pencraft may be written on a memory and read therefrom, instead of the disk.

Figure 10:
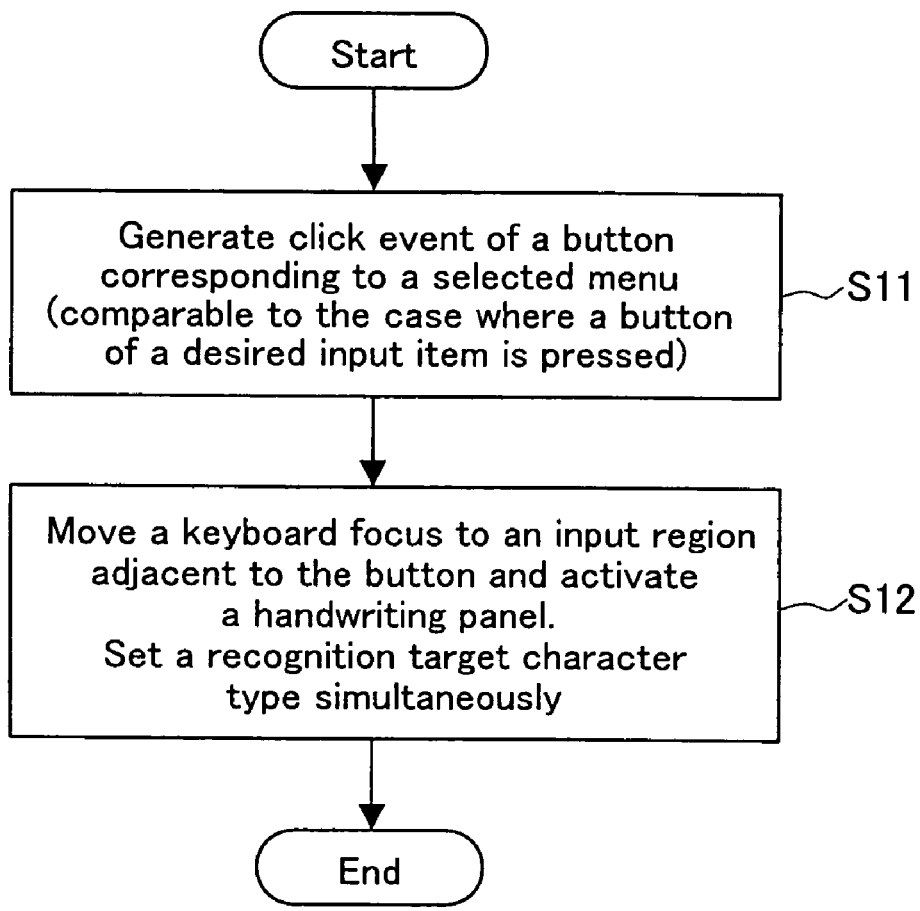
FIG. 10 is a flow chart showing the detail of processing until the character recognition window is activated after an operator selects any item in an item list, in the handwritten information input apparatus according to Embodiment 1.

FIG. 10 is a flow chart showing the detail of processing until the character recognition window 73 is activated after the operator selects any item in the item list 72.

As shown in FIG. 10, when the operator selects any item, a click event of a button corresponding to the selected item (button representing an item title in the text input item region R1) occurs (S11). More specifically, the button in the text input item region R1 is tapped with a pen, whereby data on the concerned item can be input from a keyboard and the character recognition window 73. Due to the occurrence of the click event, the result similar to the one, obtained when the button of the concerned item is tapped with a pen, is obtained in the text input item region R1. Next, a keyboard focus is moved to an input region of the button, and then, the character recognition window 73 is activated (S12). Simultaneously, a recognition target character type (e.g., classification of upper/lower case characters or alphanumeric characters, etc.) may be set in accordance with the data characteristics of items.

As described above, according to the handwritten information input apparatus of the present embodiment, the operator can easily select which item of the text input item region R1 the recognition result of the character recognition window 73 is input in, from the item list 72.

Furthermore, in the case where only a part of a number of input items is displayed in the text input item region R1, and the operator selects an item not displayed in the text input item region R1 from the item list 72, the display control part 17 switches a display of the text input item region R1 so as to display the input item selected by the operator. Consequently, unlike the conventional example, it is not necessary for the operator to find a text input item, for example, by switching a plurality of screens, whereby a simpler operation can be performed.

In the present embodiment, an example has been shown in which the text input item region R1 and the handwritten note display region R2 are displayed as regions in the same window. However, the text input item region R1 and the handwritten note display region R2 may be arranged in different windows. In this case, when the operator selects an input item, in the case where a window in which the input item is placed is hidden behind another window, it is preferable to switch a display so that the input item is displayed on a front surface.

Embodiment 2

Hereinafter, the handwritten information input apparatus according to Embodiment 2 of the present invention will be described with reference to FIGS. 11 to 15. The schematic configuration of the handwritten information input apparatus of the present embodiment is similar to that of Embodiment 1, so that the description thereof will be omitted. Furthermore, regarding the configuration and the like described in Embodiment 1, the same reference numerals as those therein are provided, and the description thereof will be omitted here.

In FIGS. 11 to 14, the text input item region R1 and the handwritten note display region R2 are displayed so that they are arranged side by side. However, as described in Embodiment 1, display embodiments of the text input item region R1 and the handwritten note display region R2 are arbitrary, and these regions may be displayed adjacent to each other in a vertical direction, as described in Embodiment 1.

The handwritten information input apparatus according to the present embodiment includes three kinds of character input modes: "Basic mode", "Mode 1" and "Mode 2". The "Basic mode" refers to a conventional input mode as described with reference to FIGS. 17 to 23. The "Mode 1" refers to a mode in which, when the operator designates an item of an input destination from the item list 72, data recognized from a pencraft of a handwritten note is input in the item, as described in Embodiment 1. The "Mode 2" refers to a mode in which the handwritten information input apparatus designates an item of an input destination successively in an automatic manner, and the operator selects data to be input in the designated item from a pencraft of a handwritten note in accordance with the designation of the apparatus, whereby the data recognized from the selected pencraft is input in the designated item. More specifically, the "Mode 2" is particularly useful in the case where it is necessary to input data in all the items, and in the case where data is input in required items without fail.

Figure 11:
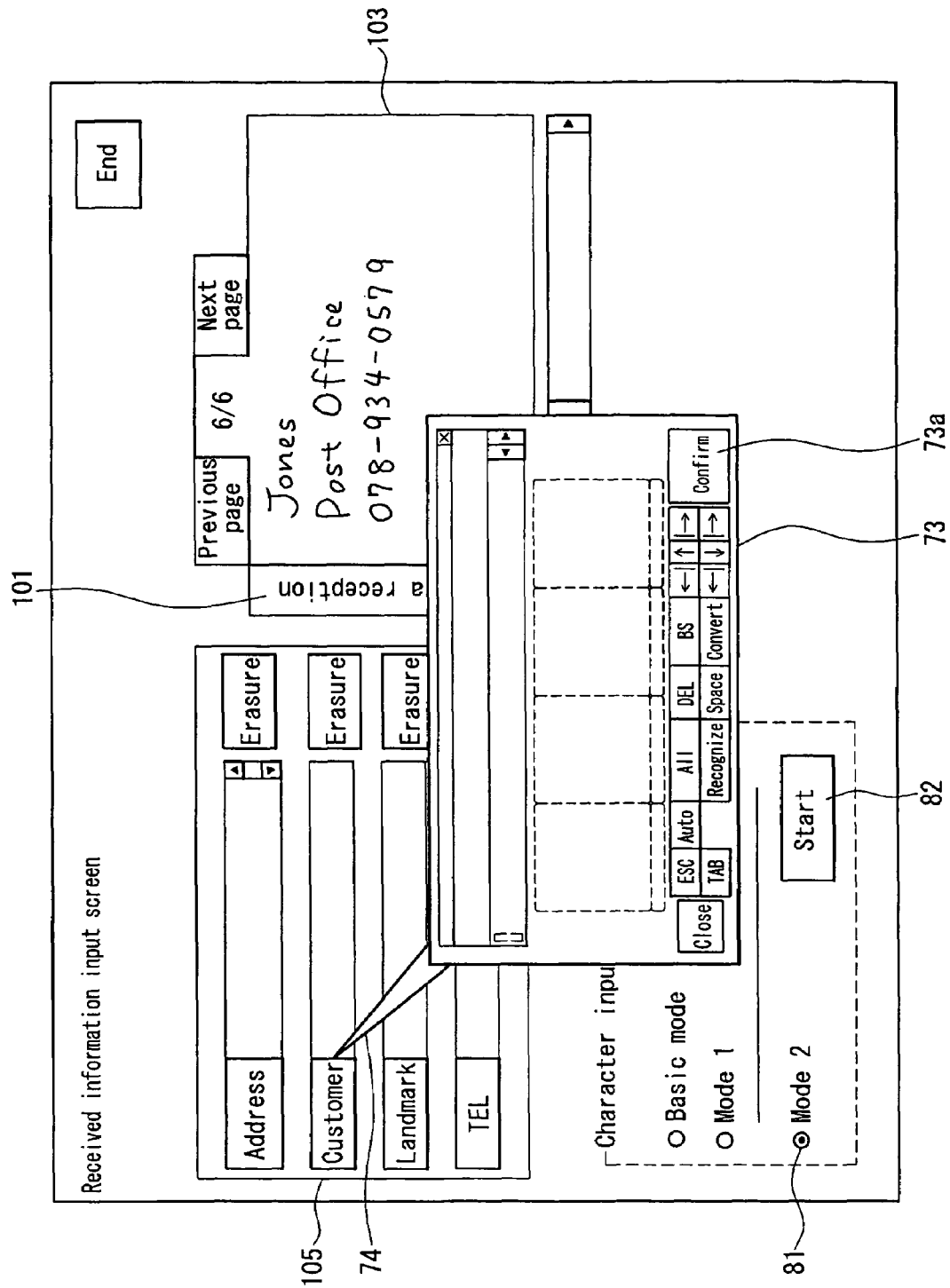
FIG. 11 shows an exemplary screen of a handwritten information input apparatus according to Embodiment 2.

In the case of the "Mode 2", as shown in FIG. 11, when the operator taps a check box 81 in the "Mode 2" and then, taps a "Start" button 82, the character recognition window 73 is activated under the condition that the tip end of the arrow-shaped graphic 74 extending from the character recognition window 73 points an item (herein, "Customer") in which a recognition result is to be initially input. The input order with respect to items is preferably stored in the item storing part 14 together with item titles. Alternatively, the order set by the operator may be stored in the item storing part 14.

Figure 12:
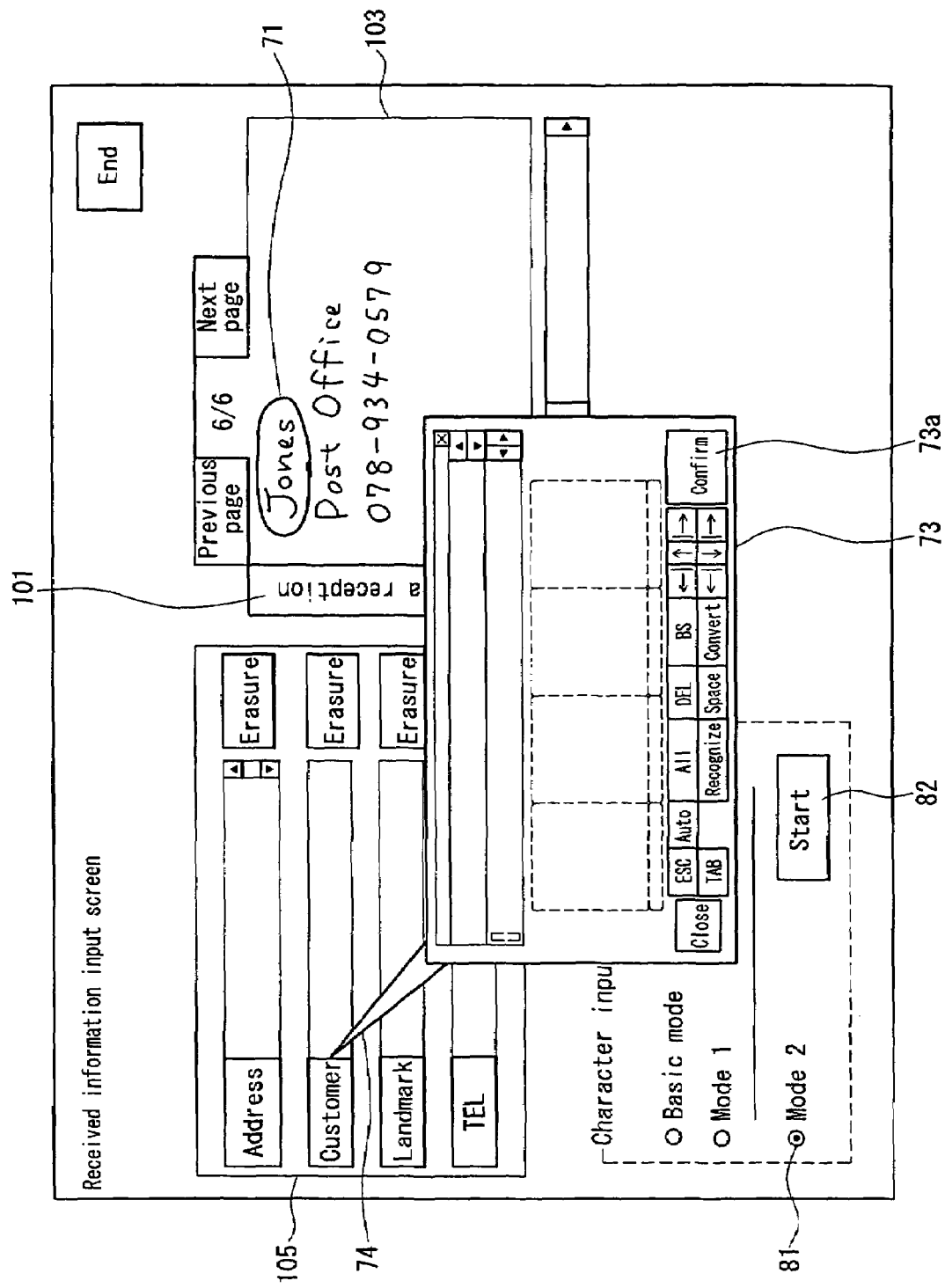
FIG. 12 shows an exemplary screen of a handwritten information input apparatus according to Embodiment 2.
Figure 13:
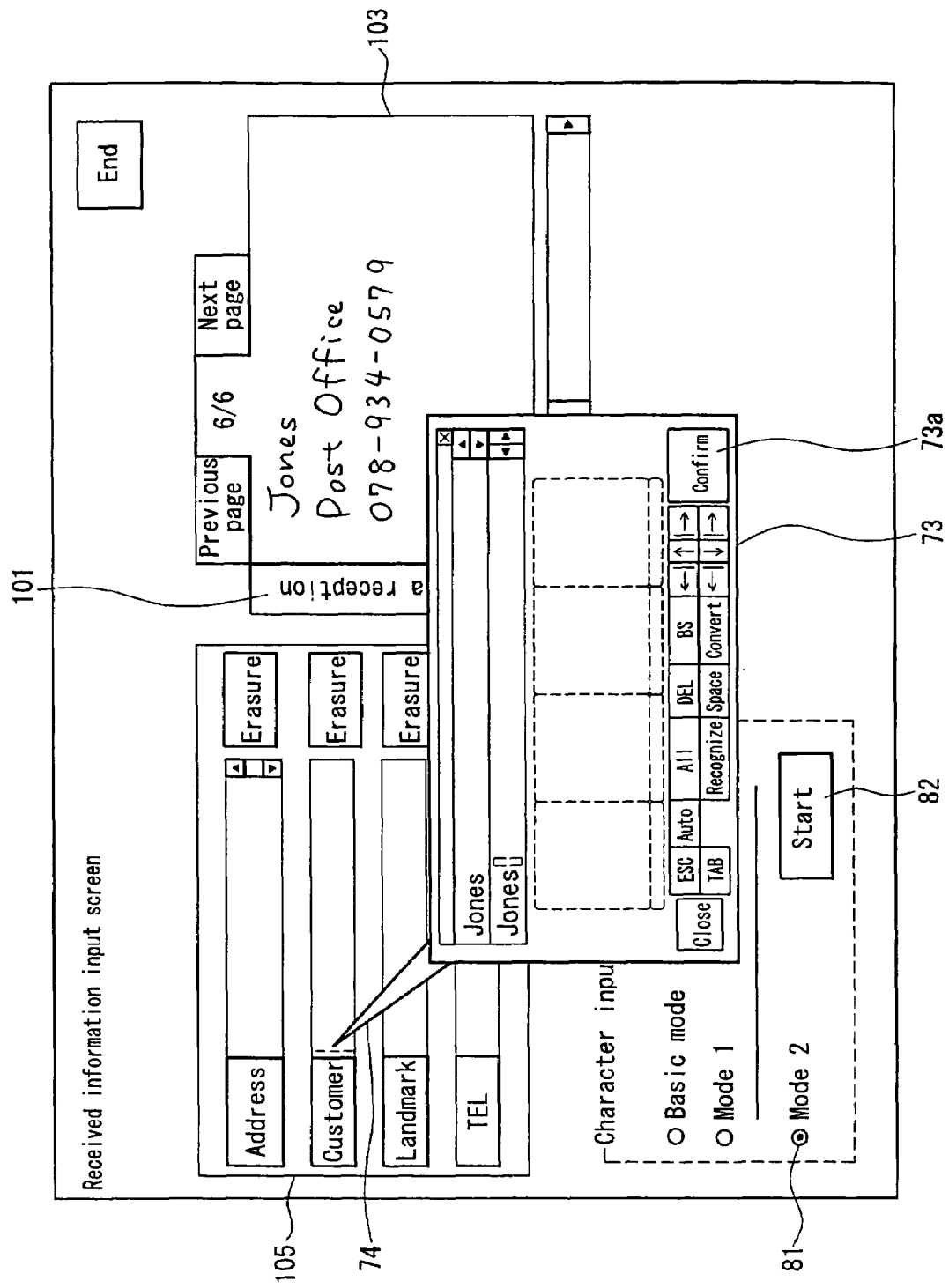
FIG. 13 shows an exemplary screen of a handwritten information input apparatus according to Embodiment 2.
Figure 14:
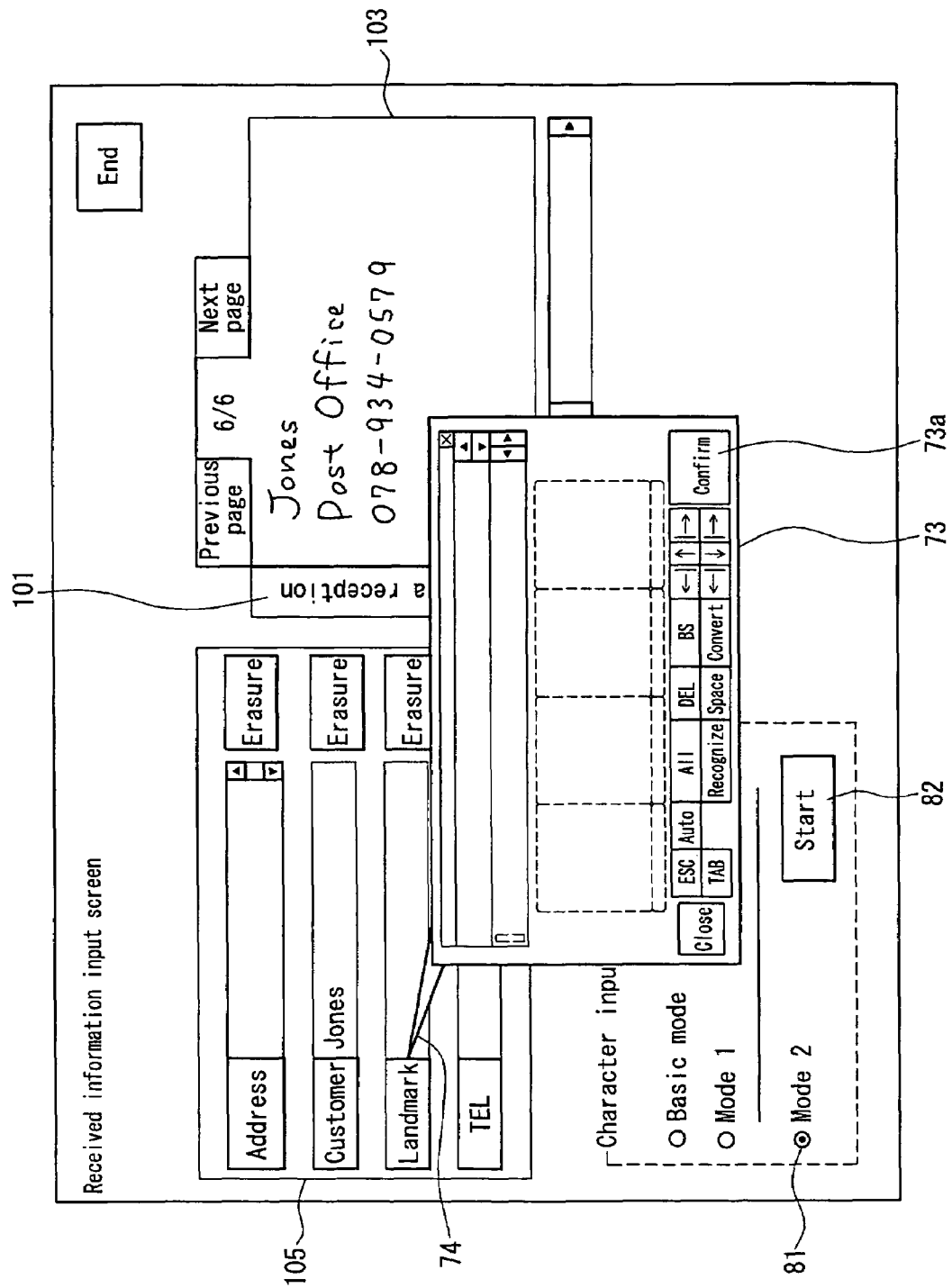
FIG. 14 shows an exemplary screen of a handwritten information input apparatus according to Embodiment 2.

As shown in FIG. 12, when the operator circles a pencraft of data corresponding to the item pointed by the arrow-shaped graphic 74 in the note displayed in the handwritten note display region R2, the character recognition window 73 recognizes a character and the like contained in the pencraft, and displays a recognition result as shown in FIG. 13. When the operator corrects erroneous recognition and the like, if required, and then taps the "confirmation" button 73a, the recognition result is inserted in an intended place. Then, as shown in FIG. 14, under the condition that the arrow-shaped graphic 74 points an item (herein, "Landmark") in which the recognition result is to be input next, the character recognition window 73 is activated again.

Figure 15:
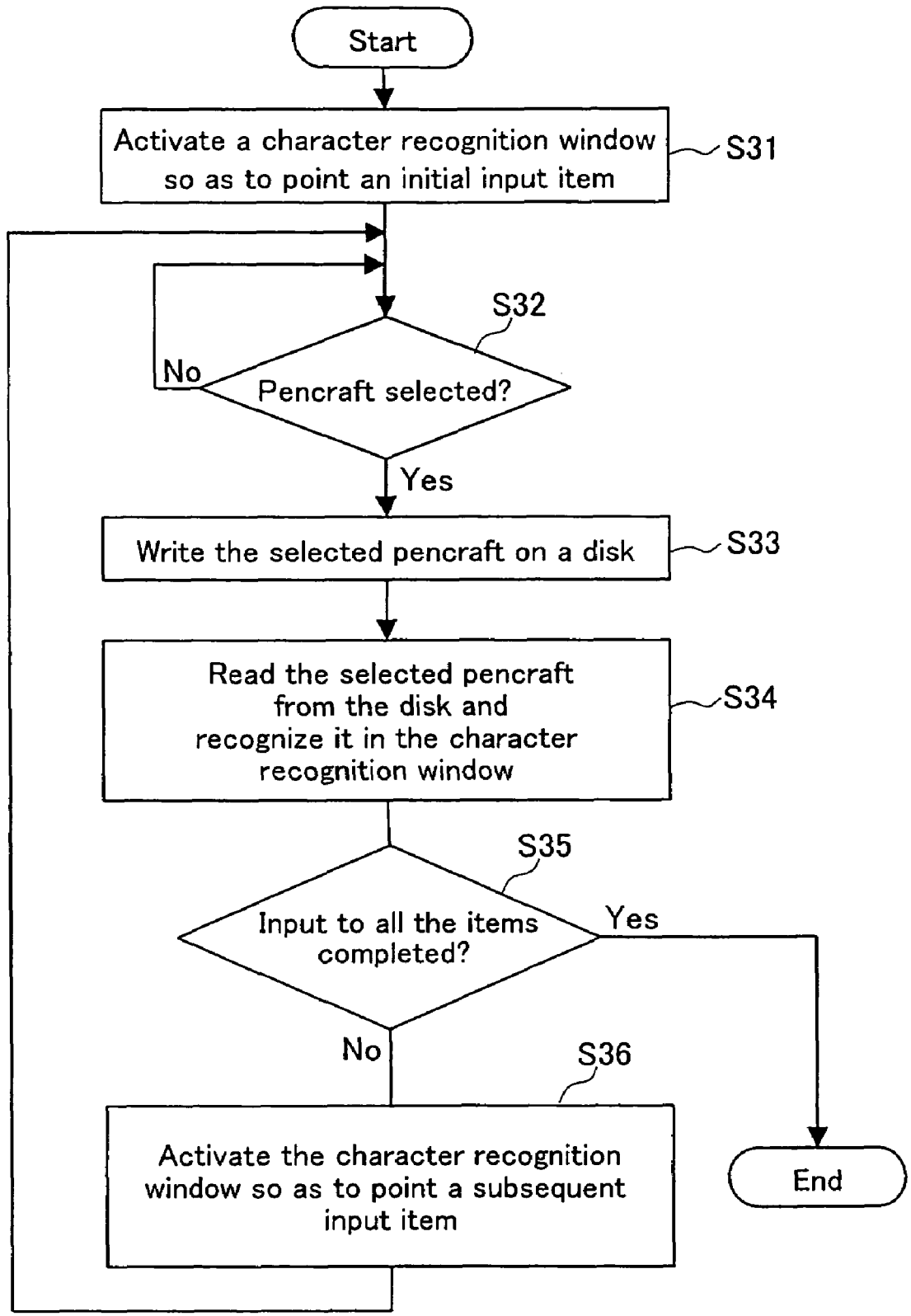
FIG. 15 is a flow chart showing the operation of the handwritten information input apparatus according to Embodiment 2.

FIG. 15 shows a flow chart showing the operation of the handwritten information input apparatus of the present embodiment. As shown in FIG. 15, first, the character recognition window 73 is activated in such a manner that an initial input item is pointed by the arrow-shaped graphic 74 (S31). Then, when the operator selects a part of a pencraft in the handwritten note display region R2 (Yes in S32), the selected pencraft is written on a disk (S33). Then, the pencraft written on the disk is given to the character recognition window 73, and the recognition result is sent to the item pointed by the arrow-shaped graphic 74 (S34). Until data input is completed with respect to all the input items (Yes in S35), the character recognition window 73 is activated in such a manner that a subsequent input item is pointed by the arrow-shaped graphic 74 (S36), whereby the above processing is repeated.

As described above, in the case of the present embodiment, the operator does not need to designate an input item. Therefore, in the case where it is necessary to input data in all the items, in the case where it is desired to input data in required items without fail, and the like, the time and effort of a user can be reduced remarkably.

In the present embodiment, although there are three operation modes: "Basic mode", "Mode 1", and "Mode 2", the handwritten information input apparatus may be operated only in the "Mode 2".

Embodiment 3

Hereinafter, a handwritten information input apparatus according to Embodiment 3 of the present invention will be described. Regarding the configuration and the like described in Embodiment 1 in the handwritten information input apparatus of the present embodiment, the same reference numerals as those therein are provided, and the description thereof will be omitted here.

The handwritten information input apparatus of the present embodiment is configured in such a manner that, after a note is taken by handwriting input, which data is likely to be input in which item in the text item input region R1 is presumed based on the described contents.

Figure 16:
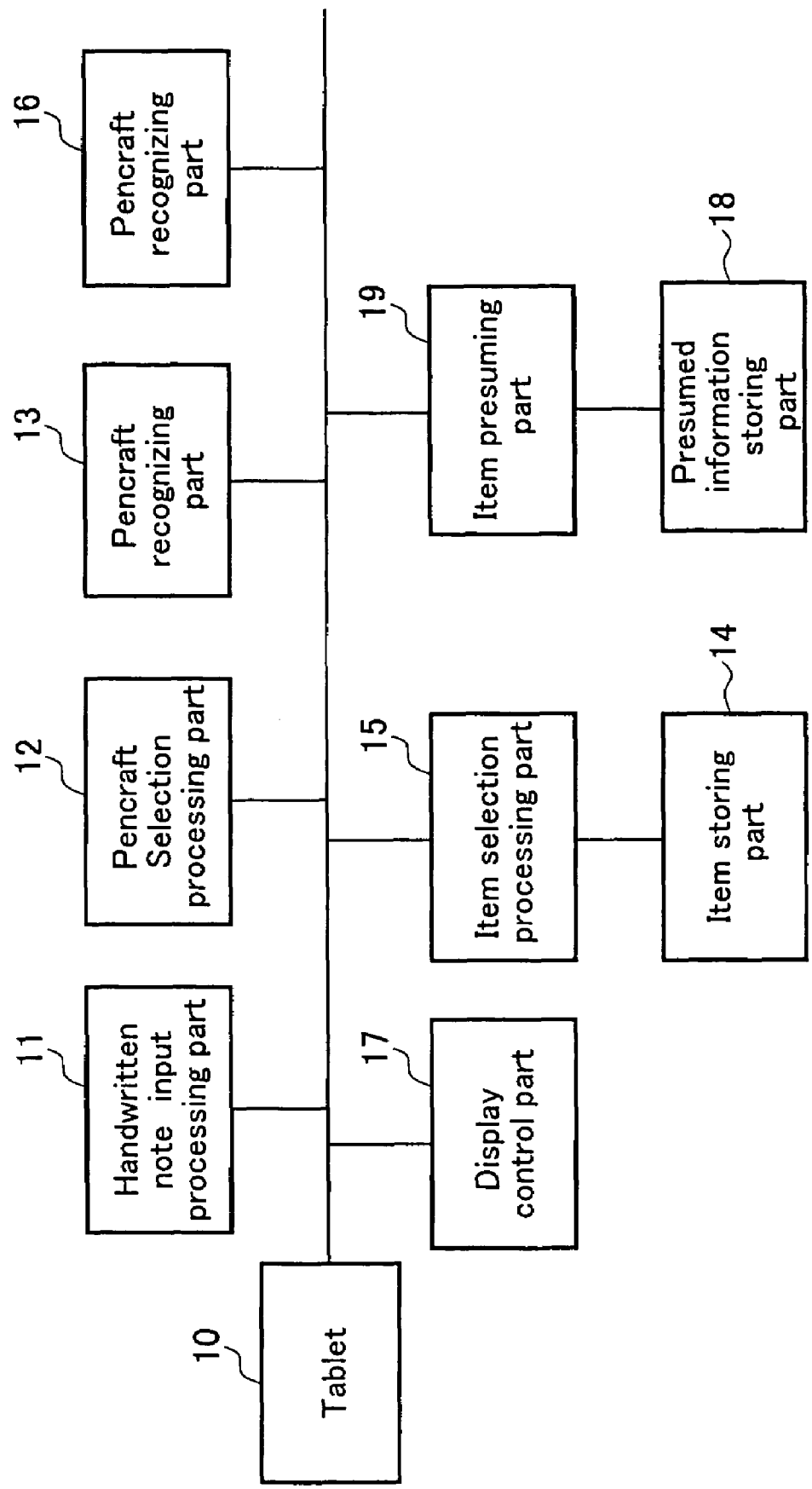
FIG. 16 is a block diagram schematically showing a configuration of a handwritten information input apparatus according to Embodiment 3.
Figure 17:
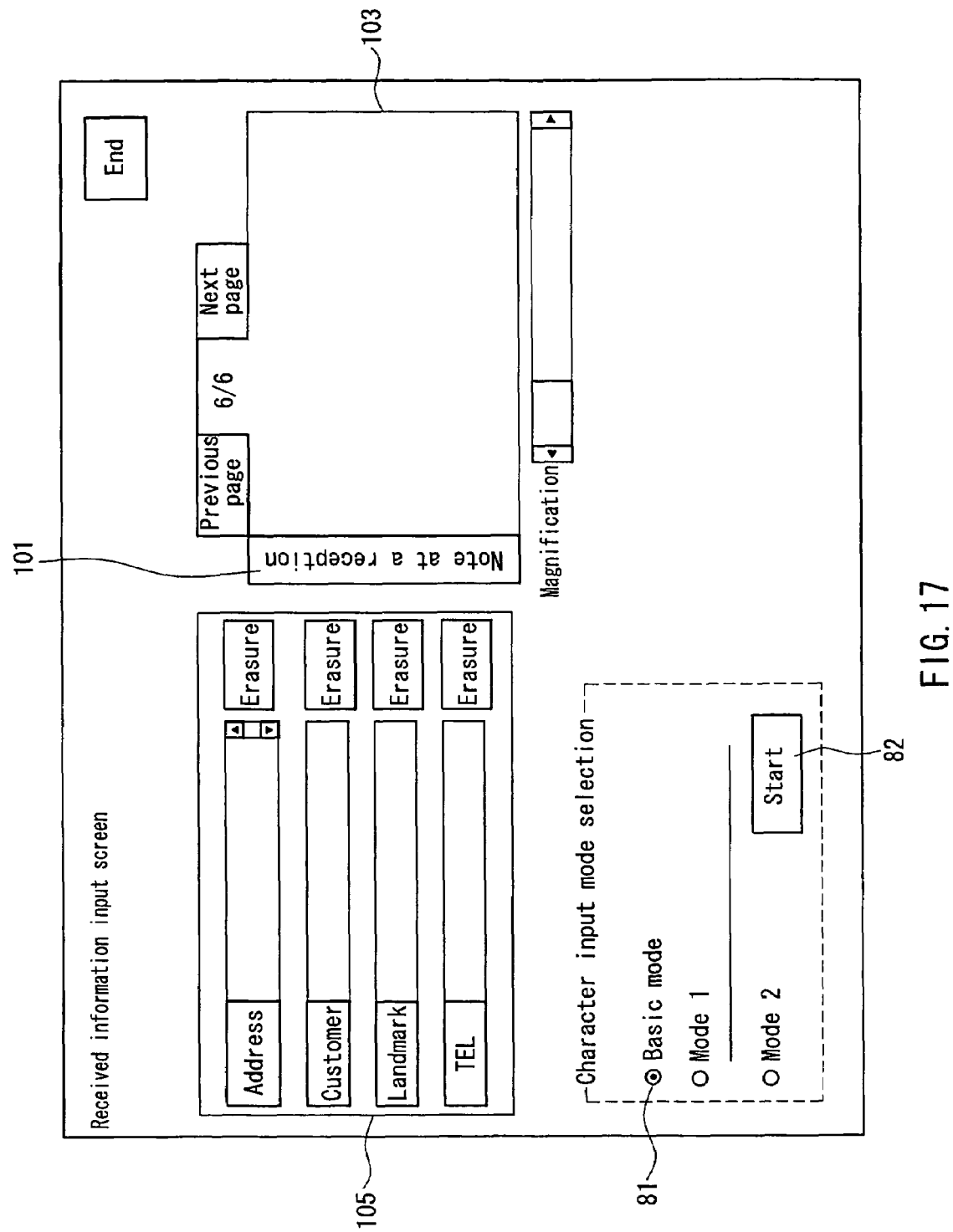
FIG. 17 shows an exemplary screen of a conventional handwritten information input apparatus.
Figure 18:
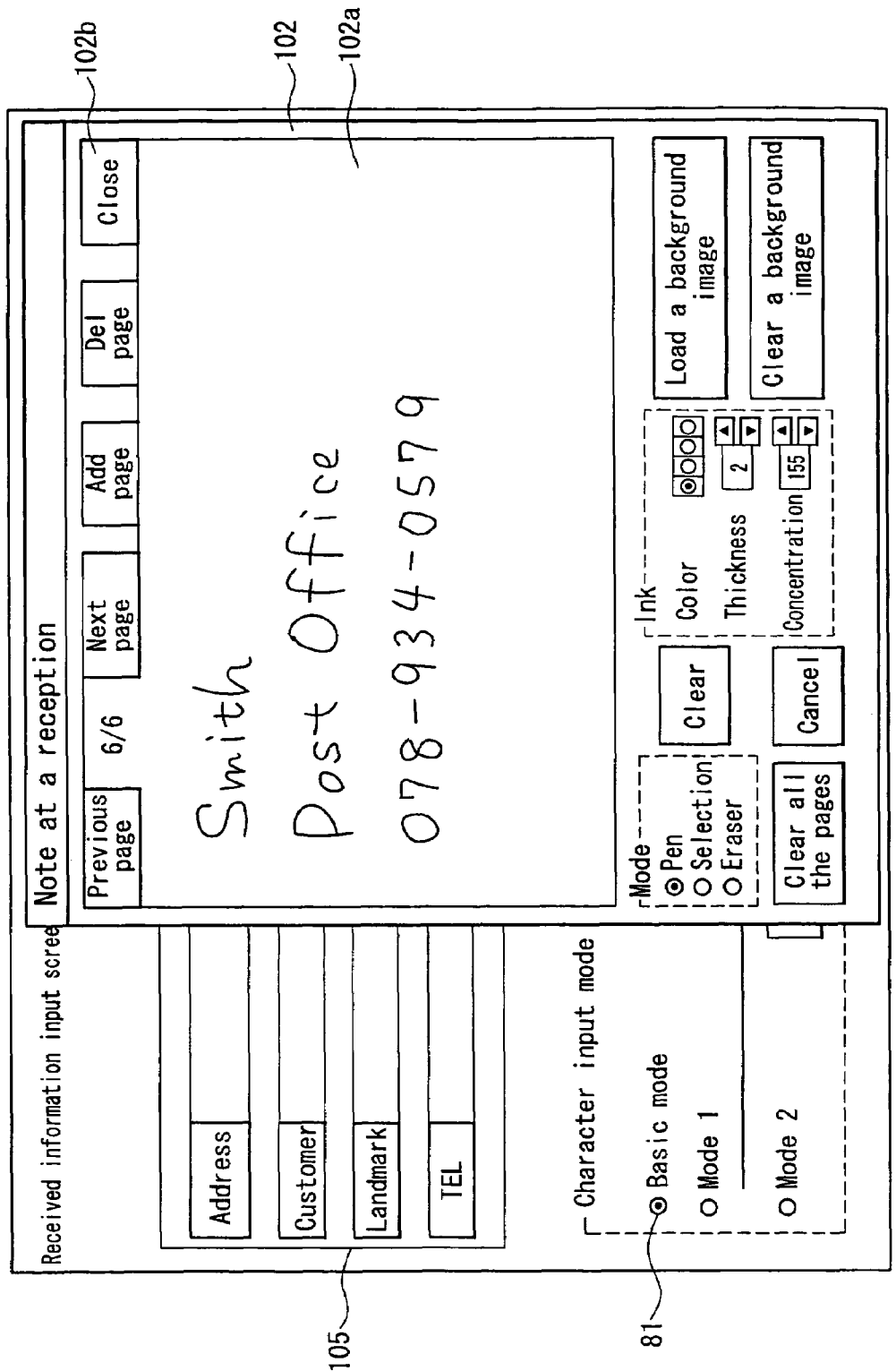
FIG. 18 shows an exemplary screen of a conventional handwritten information input apparatus.
Figure 19:
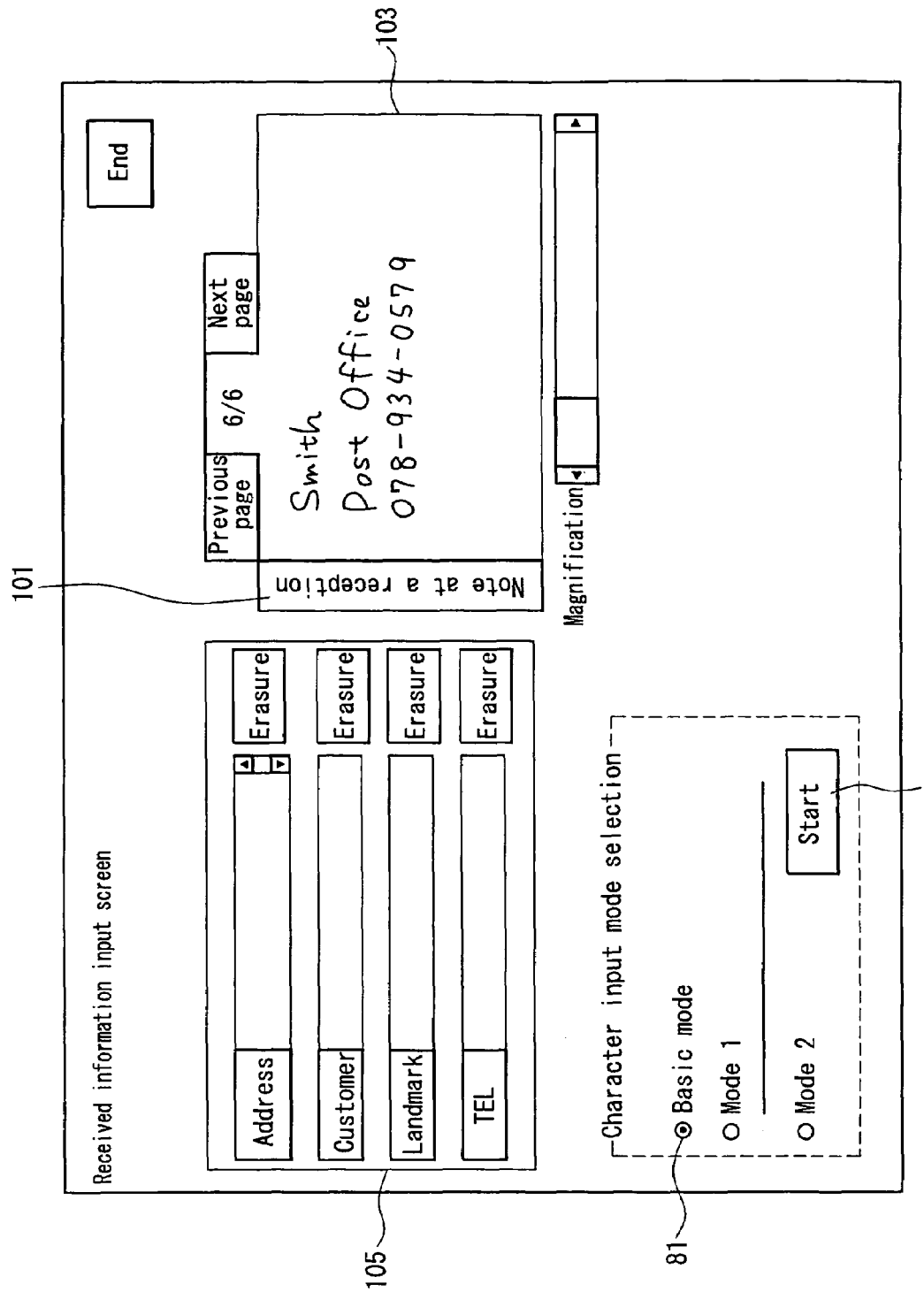
FIG. 19 shows an exemplary screen of a conventional handwritten information input apparatus.
Figure 20:
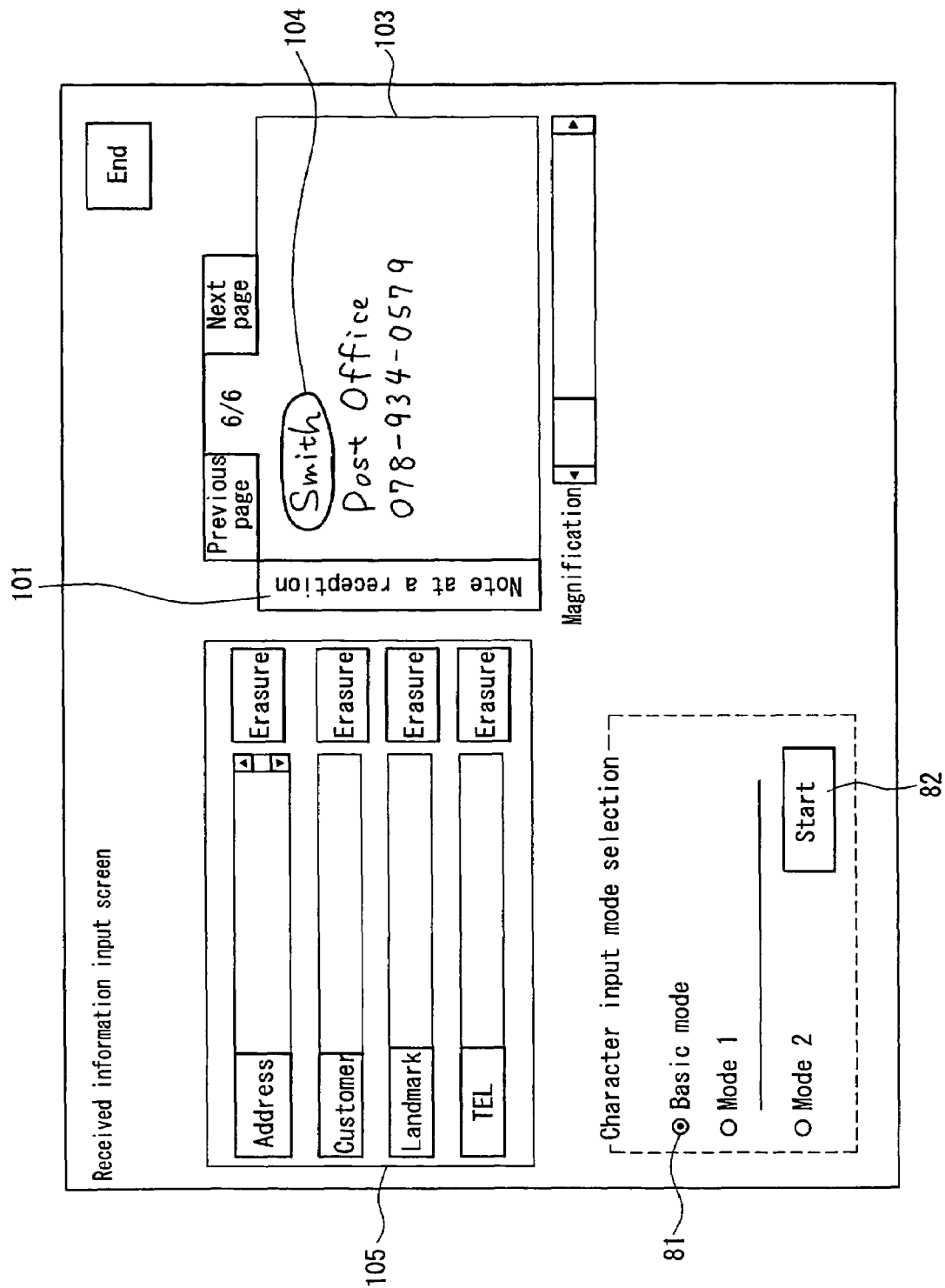
FIG. 20 shows an exemplary screen of a conventional handwritten information input apparatus.
Figure 21:
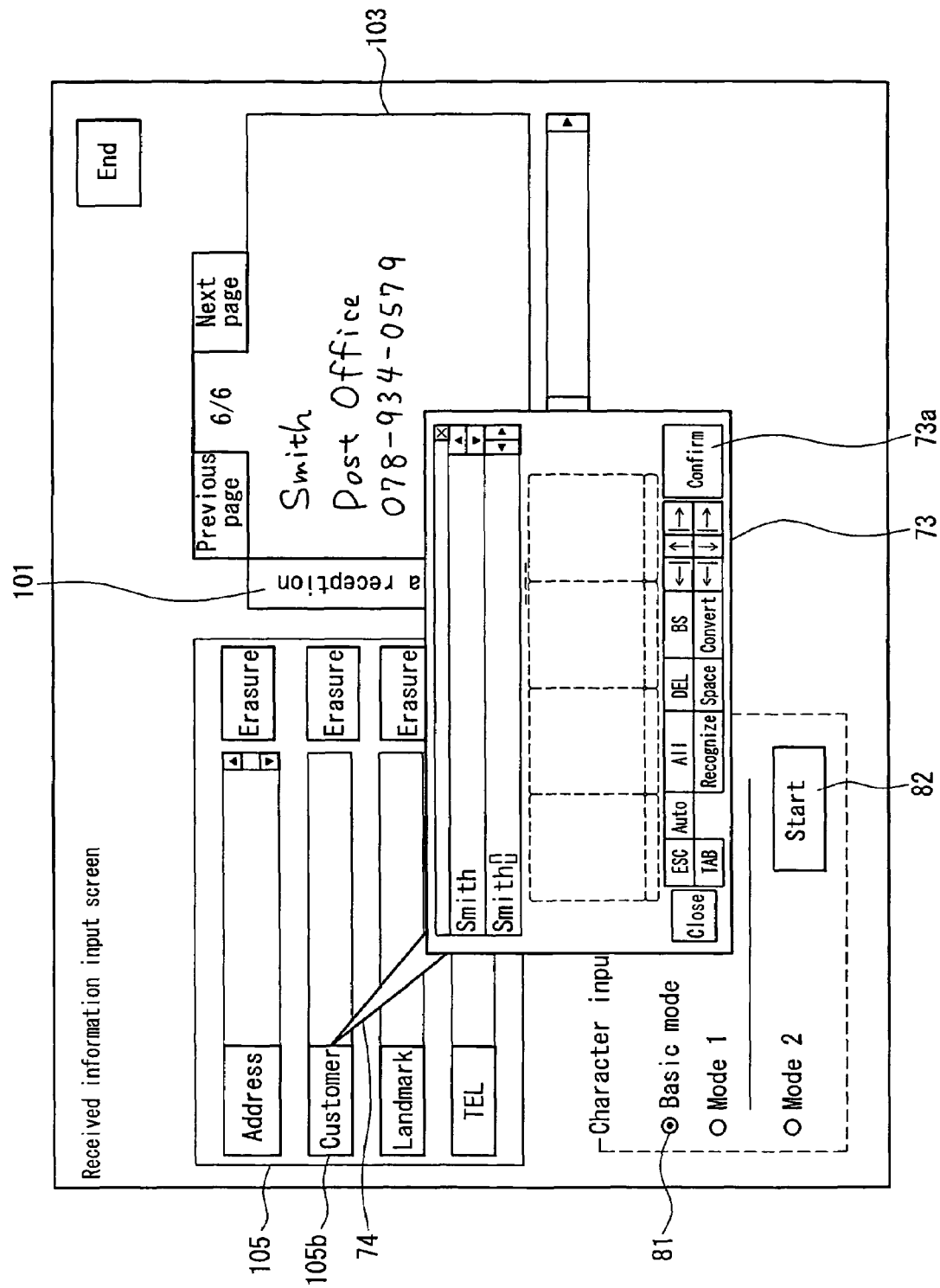
FIG. 21 shows an exemplary screen of a conventional handwritten information input apparatus.
Figure 22:
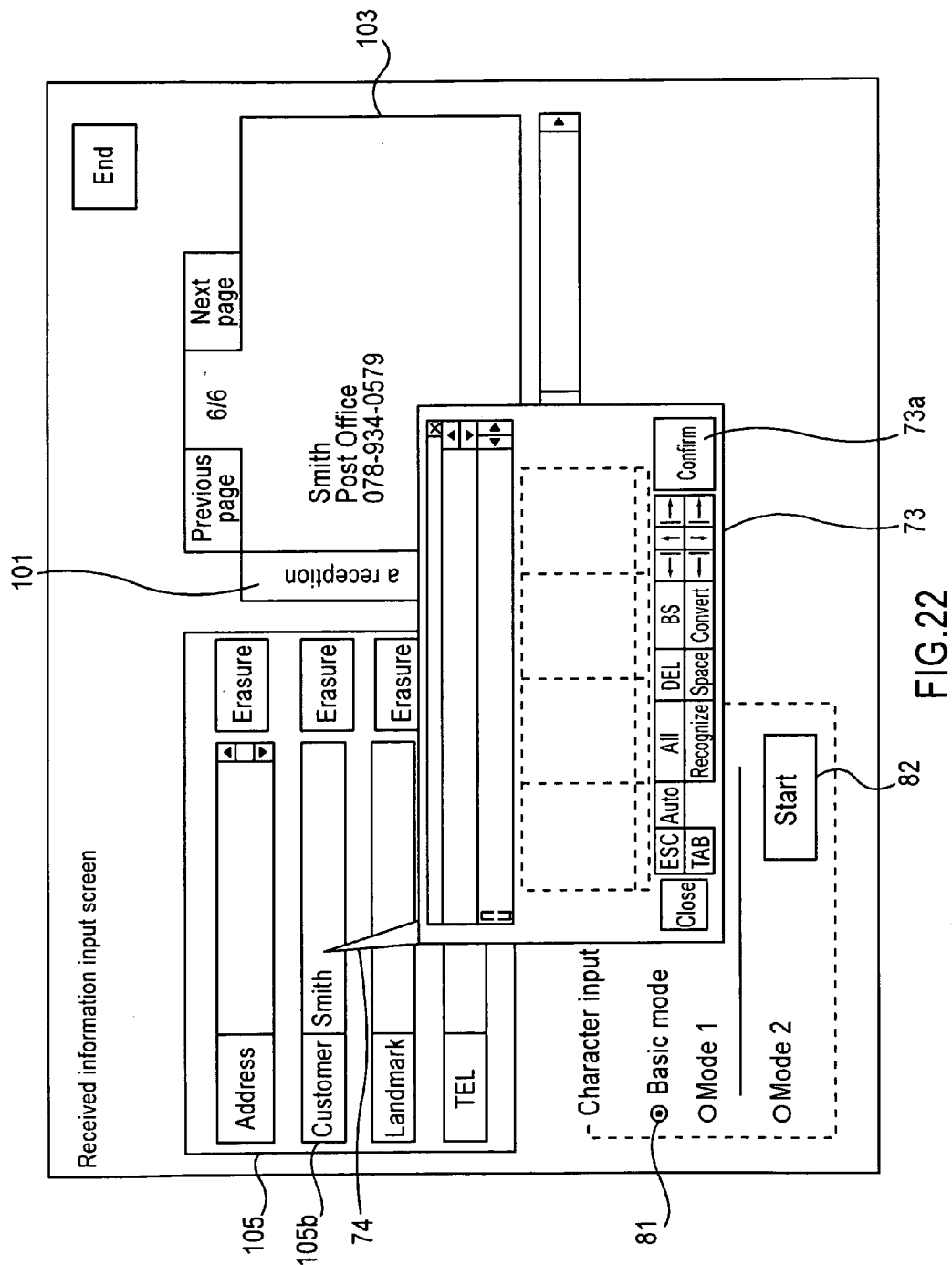
FIG. 22 shows an exemplary screen of a conventional handwritten information input apparatus.
Figure 23:
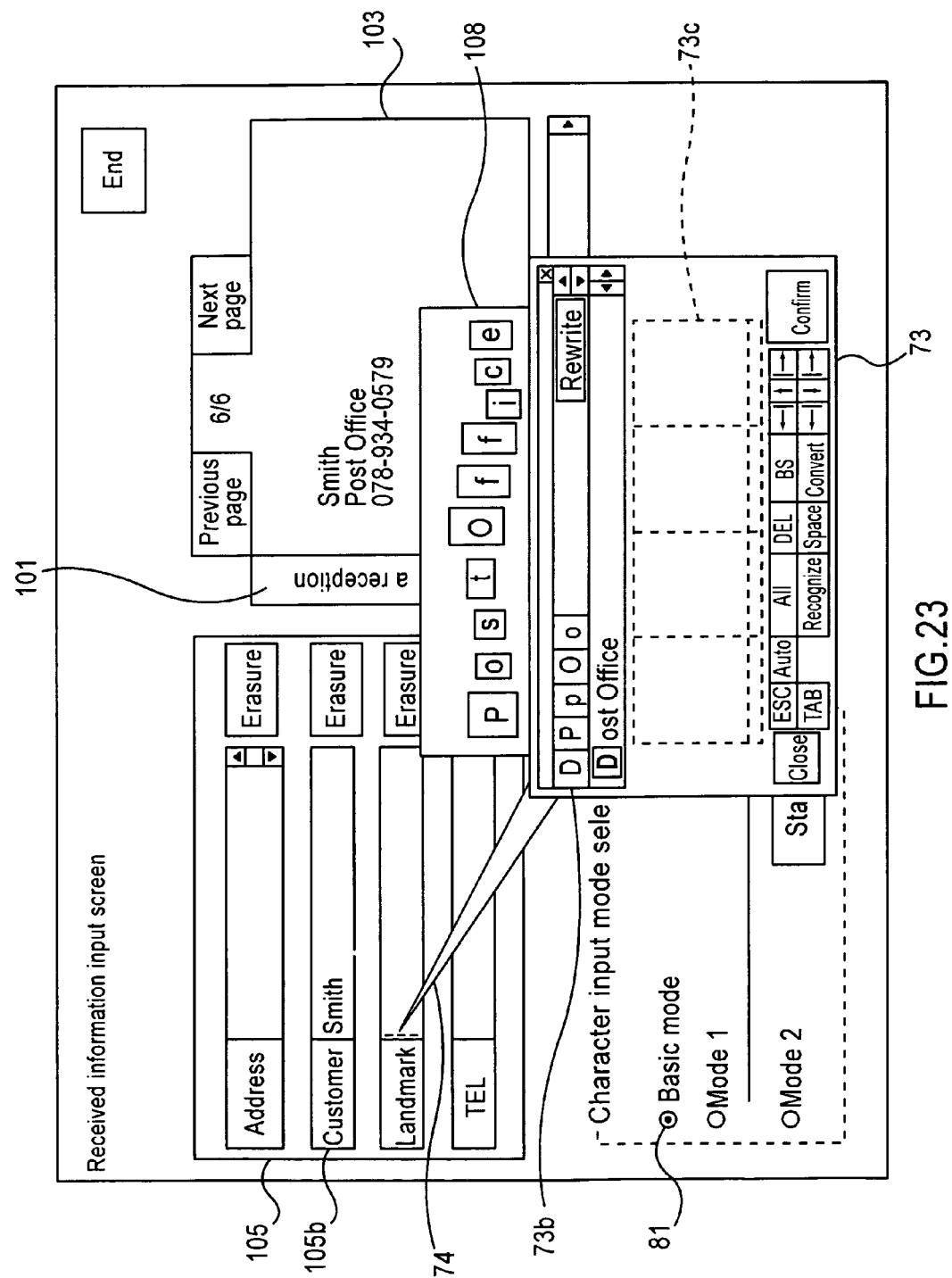
FIG. 23 shows an exemplary screen of a conventional handwritten information input apparatus.

Therefore, as shown in FIG. 16, the handwritten information input apparatus of the present embodiment further includes a presumed information storing part 18 and an item presuming part 19, in addition to the constituent elements of the handwritten information input apparatus according to Embodiment 1 shown in FIG. 1. The presumed information storing part 18 stores statistical information on data that is likely to be input in each input item. The statistical information contains statistical information on data that has been actually input in the past with respect to each input item, information representing the regularity of data that has been input in the past with respect to each input item, and the like. The presumed information storing part 18 may have a learning function.

When the operator selects a part of a pencraft in the handwritten note display region R2, the item presuming part 19 receives a recognition result from the pencraft from the pencraft recognizing part 13, and presumes which of the input items registered in the item storing part 14 the data on the selected pencraft is likely to be input in, with reference to the statistical information of the presumed information storing part 18. For example, if the selected pencraft is a character string frequently used as a human name, a company name, or the like, the item "Customer" is presumed as an input item. If the selected pencraft is a character string of a predetermined number of columns composed of a combination of numerals and hyphens, the selected pencraft can be presumed to be input data to the "Telephone".

Then, the presumed result of the item presuming part 19 is given to the item selection processing part 15, and the item selection processing part 15 gives priority to the input items to be presented in the item list 72, whereby the item presumed to have a high possibility of becoming an input destination of data is preferentially displayed in the item list 72. For example, it is considered that such an item is displayed in a higher-order place in the item list 72, and only such an item is displayed in the item list 72. Alternatively, in the case where it is determined that there is a very high possibility that any one item becomes a data input destination, the character recognition window 73 is activated under the condition that the arrow-shaped graphic 74 points the input item from the character recognition window 73 without displaying the item list 72. According to this configuration, in the case where the input destination item is matched with the recognition result, the operator can send the recognition result of the selected pencraft to the item with a very simple operation of merely pressing a confirmation button. In the case where the presumed result of the input destination is incorrect, the operator can correct an input destination.

As described above, according to the present embodiment, the recognition result from the pencraft of a note input by handwriting is compared with the statistical information of the presumed information storing part 18, whereby it is possible to presume which input item the recognition results is input in and narrow down a choice of options for the input items. This can save the operator from the time and effort for selecting an input destination item.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A handwritten information input apparatus, comprising:
    an input/output apparatus including a handwriting input region for receiving a handwritten input of a character, a symbol, or a graphic and displaying an input pencraft, and an input item region for displaying the character, the symbol, or the graphic as a recognition result of the pencraft for each input item;
    a pencraft selection processing part for receiving a handwritten input that selects at least a part of the pencraft displayed in the handwriting input region, and confirming the selected pencraft;
    a pencraft recognizing part for recognizing the selected pencraft when the selected pencraft is confirmed by the pencraft selection processing part, converting the pencraft into a character, a symbol, or a graphic as a recognition result, and allowing a revision of the recognition result if the recognition result is not correct;
    an item storing part for previously storing a title of an input item to be displayed in the input item region;
    an item selection processing part for generating an item title list for allowing an operator to select which input item in the item title list a recognition result of the pencraft recognizing part is sent to, based on the title stored in the item storing part and switching a display item in the input item region so that the input item selected in the item title list is displayed; and
    an item input part for sending the character, the symbol, or the graphic as the recognition result of the pencraft recognizing part to the input item region of the input item selected in the item title list, thereby displaying the character, the symbol, or the graphic.

2. The handwritten information input apparatus according to claim 1, wherein the item selection processing part displays the item title list after the pencraft is selected by the pencraft selection processing part.

3. The handwritten information input apparatus according to claim 1, wherein the item selection processing part displays the item title list before the pencraft is selected by the pencraft selection processing part.

4. The handwritten information input apparatus according to claim 1, wherein the item selection processing part displays the item title list in the vicinity of the pencraft selected by the pencraft selection processing part.

5. The handwritten information input apparatus according to claim 1, wherein the item selection processing part displays the item title list in the vicinity of a pen-up position or a pen-down position of the pencraft selected by the pencraft selection processing part.

6. The handwritten information input apparatus according to claim 1, wherein the input/output apparatus is an electromagnetic tablet,
    the display control part acquires information on a pen point position of a pen, and
    the item selection processing part displays the item title list in the vicinity of the acquired pen point position.

7. The handwritten information input apparatus according to claim 1, wherein the input/output apparatus is an electromagnetic tablet,
    the display control part acquires information on a pen point position of a pen whenever necessary until the item title list is selected after the pencraft is selected, and
    the item selection processing part displays the item title list in the vicinity of the acquired latest pen point position so that the item title list follows the pen point position.

8. The handwritten information input apparatus according to claim 1, wherein the input/output apparatus switches a display item in the input item region so that the input item selected in the item title list is displayed.

9. The handwritten information input apparatus according to claim 1, wherein, in a case where data is input in the input item from an identical pencraft a plurality of times, the item title list is displayed at second and subsequent times under a condition that an input item selected previously is not to be selected or that the input item selected previously is excluded from the item title list.

10. The handwritten information input apparatus according to claim 1, comprising:
    a presumed information storing part for storing statistical information on input data with respect to each item, regarding an input item displayed in the input item region; and
    an item presuming part for presuming an input item to which the recognition result is to be sent, based on a content of the recognition result of the pencraft recognizing part and the statistical information in the presumed information storing part, and giving the presumed result to the item selection processing part, thereby narrowing down items to be presented in the item title list.

11. A handwritten information input apparatus, comprising:
    an input/output apparatus including a handwriting input region for receiving a handwritten input of a character, a symbol, or a graphic and displaying an input pencraft, and an input item region for displaying the character, the symbol, or the graphic as a recognition result of the pencraft for each input item;
    a pencraft selection processing part for receiving a handwritten input that selects at least a part of the pencraft displayed in the handwriting input region, and confirming the selected pencraft;
    a pencraft recognizing part for recognizing the selected pencraft when the selected pencraft is confirmed by the pencraft selection processing part, converting the pencraft into a character, a symbol, or a graphic as a recognition result, and allowing a revision of the recognition result if the recognition result is not correct;
    an item storing part for previously storing a title of an input item to be displayed in the input item region;
    an item selection processing part for successively designating at least a partial input item to be displayed in the input item region, based on the title stored in the item storing part, thereby designating which input item in the input item region a recognition result of the pencraft recognizing part is sent to, with respect to an operator and switching a display item in the input item region so that the input item designated is displayed; and an item input part for sending the character, the symbol, or the graphic as the recognition result of the pencraft recognizing part to the input item region of the input item designated by the item selection processing part, thereby displaying the character, the symbol, or the graphic.

12. A program product storing, on a recording medium, a program for allowing a computer, which is provided with an input/output apparatus including a handwriting input region for receiving a handwritten input of a character, a symbol, or a graphic, and displaying an input pencraft, and an input item region for displaying the character, the symbol, or the graphic as a recognition result of the pencraft for each input item, to perform handwritten information input processing, wherein the program allows the computer to perform:

pencraft selection processing for receiving a handwritten input that selects at least a part of a pencraft displayed in the handwriting input region, and confirming the selected pencraft;

pencraft recognizing processing for recognizing the selected pencraft when the selected pencraft is confirmed by the pencraft selection processing, converting the pencraft into a character, a symbol, or a graphic as a recognition result, and allowing a revision of the recognition result if the recognition result is not correct;

item selection processing for referring to an item storing part for previously storing a title of an input item to be displayed in the input item region, generating an item title list for allowing an operator to select which input item in the item title list a recognition result of the pencraft recognizing processing is sent to, based on the title, and switching a display item in the input item region so that the input item selected in the item title list is displayed;

item input processing for sending the character, the symbol, or the graphic as the recognition result of the pencraft recognizing processing to the input item region as the input item selected in the item title list; and displaying the character, the symbol, or the graphic.

13. A program product storing, on a recording medium, a program for allowing a computer, which is provided with an input/output apparatus including a handwriting input region for receiving a handwritten input of a character, a symbol, or a graphic, and displaying an input pencraft, and an input item region for displaying the character, the symbol, or the graphic as a recognition result of the pencraft for each input item, to perform handwritten information input processing, wherein the program allows the computer to perform:

pencraft selection processing for receiving a handwritten input that selects at least a part of a pencraft displayed in the handwriting input region, and confirming the selected pencraft;

pencraft recognizing processing for recognizing the selected pencraft when the selected pencraft is confirmed by the pencraft selection processing, converting the pencraft into a character, a symbol, or a graphic as a recognition result, and allowing a revision of the recognition result if the recognition result is not correct;

item selection processing for referring to an item storing part for previously storing a title of an input item to be displayed in the input item region, and successively designating at least a partial item to be displayed in the input item region, based on the title, thereby designating which input item in the input item region a recognition result of the pencraft recognizing part is sent to, with respect to an operator, and switching a display item in the input item region so that the input item designated is displayed;

item input processing for sending the character, the symbol, or the graphic as the recognition result of the pencraft recognizing processing to the input item region as the input item designated in the item selection processing; and displaying the character, the symbol, or the graphic.

* * * * *